US012195634B2

(12) United States Patent
Mabe et al.

(10) Patent No.: US 12,195,634 B2
(45) Date of Patent: Jan. 14, 2025

(54) OPTICALLY TRANSPARENT 3D PRINTED POLYSILOXANE SCINTILLATORS

(71) Applicant: Lawrence Livermore National Security, LLC, Livermore, CA (US)

(72) Inventors: Andrew Neil Mabe, Livermore, CA (US); Jason Brodsky, Livermore, CA (US); Elaine Lee, Brooklyn, NY (US); Jeremy Lenhardt, Tracy, CA (US); Dominique Henry Porcincula, Oakland, CA (US); Xianyi Zhang, Newark, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 182 days.

(21) Appl. No.: 17/232,521

(22) Filed: Apr. 16, 2021

(65) Prior Publication Data

US 2021/0324217 A1 Oct. 21, 2021

Related U.S. Application Data

(60) Provisional application No. 63/011,788, filed on Apr. 17, 2020.

(51) Int. Cl.
  *B33Y 10/00* (2015.01)
  *B29C 64/106* (2017.01)
  (Continued)

(52) U.S. Cl.
  CPC ............ *C09D 11/50* (2013.01); *B29C 64/106* (2017.08); *B33Y 10/00* (2014.12); *B33Y 70/00* (2014.12); *B33Y 80/00* (2014.12); *C09D 11/037* (2013.01); *C09D 11/102* (2013.01); *C09K 11/02* (2013.01); *G01T 1/2018* (2013.01);
  (Continued)

(58) Field of Classification Search
  CPC ..... C09D 11/50; C09D 11/037; C09D 11/102; C09D 11/02; C09D 11/03; B29C 64/106; B33Y 70/00; B33Y 10/00; B33Y 80/00; G01T 1/2018; G01T 1/2033;
  (Continued)

(56) References Cited

U.S. PATENT DOCUMENTS 5,110,500 A    5/1992  Walker
11,307,314 B2 * 4/2022  Akgun ................. G01T 1/20
                        (Continued)

FOREIGN PATENT DOCUMENTS

JP           2001228253 A      8/2001

OTHER PUBLICATIONS

Guillaume et al. "Current Status on Plastic Scintillators Modifications", Wiley-VCH Verlag Gmbh & Co. KGaA, Weinheim, Chem. Eur . J. 2014, p. 15660-15685 (Year: 2014).*

(Continued)

*Primary Examiner* — David P Porta
*Assistant Examiner* — Mamadou Faye
(74) *Attorney, Agent, or Firm* — Zilka-Kotab, P. C.

(57) ABSTRACT

An ink for forming a scintillator product includes a phenylated siloxane polymer having at least one functional group per molecule for crosslinking, a filler having a refractive index about matching a refractive index of the phenylated siloxane polymer, where the refractive indices are within about 5% of one another, a rheology modifier, and at least one fluorescent dye.

25 Claims, 10 Drawing Sheets

(51) Int. Cl.

| | |
|---|---|
| *B33Y 70/00* | (2020.01) |
| *B33Y 80/00* | (2015.01) |
| *C09D 11/037* | (2014.01) |
| *C09D 11/102* | (2014.01) |
| *C09D 11/50* | (2014.01) |
| *C09K 11/02* | (2006.01) |
| *G01T 1/20* | (2006.01) |
| *G01T 1/203* | (2006.01) |
| *B29K 83/00* | (2006.01) |
| *B29K 105/00* | (2006.01) |

(52) U.S. Cl.
CPC ........ *G01T 1/2033* (2013.01); *B29K 2083/00* (2013.01); *B29K 2105/0032* (2013.01); *B29K 2995/0035* (2013.01)

(58) Field of Classification Search
CPC ........ B29K 2083/00; B29K 2105/0032; B29K 2995/0035
See application file for complete search history.

(56) References Cited

U.S. PATENT DOCUMENTS

| | | | |
|---|---|---|---|
| 2009/0121141 A1 | 5/2009 | Eriksson et al. | |
| 2009/0202043 A1 | 8/2009 | Cantu et al. | |
| 2009/0236530 A1 | 9/2009 | Bell et al. | |
| 2010/0062552 A1* | 3/2010 | Miyawaki | C08L 83/06 438/26 |
| 2012/0145963 A1 | 6/2012 | Andreaco et al. | |
| 2012/0321042 A1 | 12/2012 | Watanabe et al. | |
| 2014/0312236 A1* | 10/2014 | Kondrasovs | G01T 1/2008 250/362 |
| 2018/0042718 A1* | 2/2018 | Remenschneider | A61L 27/3839 |
| 2019/0100626 A1* | 4/2019 | Durban | B33Y 70/10 |
| 2021/0103060 A1 | 4/2021 | Brodsky et al. | |

OTHER PUBLICATIONS

Justine "Tailoring Siloxane Functionality for Lithography-based 3D Printing", Dissertation, Doctor of Philosophy in Macromolecular Science and Engineering, Virginia Polytechnic Institute and State University, Jun. 19, 2018 p. 1-328 (Year: 2018).*

Son et al., "Improved 3D Printing Plastic Scintillator Fabrication," Journal of the Korean Physical Society, vol. 73, No. 7, Oct. 2018, pp. 887-892.

Bell et al., "Boron-Loaded Silicone Rubber Scintillators," IEEE Transactions on Nuclear Science, vol. 51, No. 4, Aug. 2004, pp. 1773-1776.

Feygelman et al., "Polysiloxane-based scintillators: 1,1,4,4-tetraphenylbutadiene as a secondary fluor," Nuclear Instruments and Methods in Physics Research A295, 1990, pp. 94-98.

Marchi et al., "Optical properties and pulse shape discrimination in siloxane-based scintillation detectors," Scientific Reports, Jun. 2019, pp. 1-13.

Quaranta et al., "Doped polysiloxane scintillators for thermal neutrons detection," Journal of Non-Crystalline Solids, vol. 357, 2011, pp. 1921-1925.

Mishnayot et al., "3D Printing of Scintillating Materials," Review of Scientific Instruments, 2014, 3 pages, retrieved from https://inspirehep.net/literature/1301261.

Robeyns et al., "Synthesis, characterization and modification of silicone resins: An 'Augmented Review'," Progress in Organic Coatings, vol. 125, 2018, pp. 287-315.

Durrance et al., "3D Printing Plastic Scintillators," poster abstract from 84th Annual Meeting of the APS Southeastern Section, vol. 62, No. 13, Abstract ID: BAPS.2017.SES.W1.90, 2 pages, 2017, retrieved from http://meetings.aps.org/Meeting/SES17/Session/W1.90.

U.S. Appl. No. 62/912,350, filed Oct. 8, 2019.

Brodsky et al., U.S. Appl. No. 17/065,103, filed Oct. 7, 2020.

International Application No. PCT/US2020/54812 filed on Oct. 8, 2020.

International Search Report and Written Opinion from PCT Application No. PCT/US2020/54812, dated Jan. 29, 2021.

Quaranta et al., "Characterization of polysiloxane organic scintillators produced with different phenyl containing blends," Materials Chemistry and Physics, vol. 137, 2013, pp. 951-958.

Zhang et al., "The Architected Multi-material Scintillator System: Designs and Modeling," arXiv preprint, Mar. 2021, 29 pages, retrieved from https://arxiv.org/abs/2103.02196.

Mishnayot et al., "3D Printing of Scintillating Materials," Review of Scientific Instruments, vol. 85, 2014, 3 pages, retrieved from https://inspirehep.net/literature/1301261.

International Search Report and Written Opinion from PCT Application No. PCT/US2021/027662, dated Aug. 30, 2021.

Sirrine, J., "Tailoring Siloxane Functionality for Lithography-based 3D Printing," Dissertation submitted to the faculty of the Virginia Polytechnic Institute and State University, Jun. 19, 2018, 357 pages.

Brodsky et al., "MMSS PID Modeling Report," Lawrence Livermore National Laboratory, Techincal Report No. LLNL-TR-808580, Apr. 14, 2020, 21 pages.

Dalla Palma et al., "Red Emitting Phenyl-Polysiloxane Based Scintillators for Neutron Detection," IEEE Transactions on Nuclear Science, vol. 61, No. 4, 2014, pp.

International Preliminary Examination Report from PCT Application No. PCT/US2021/027662, dated, Oct. 13, 2022, 7 pages.

Office Action from Canadian Application No. 3,171,132, dated Nov. 2, 2023, 3 pages.

Extended European Search Report from European Application No. 21787913.9, dated Apr. 2, 2024, 4 pages.

Mishnayot et al., "Three-dimensional Printing of Scintillating Materials," Review of Scientific Instruments, vol. 85, Aug. 2014, pp. 1-3.

Office Action from Canadian Patent Application No. 3,171,132, dated Oct. 1, 2024, 3 pages.

* cited by examiner

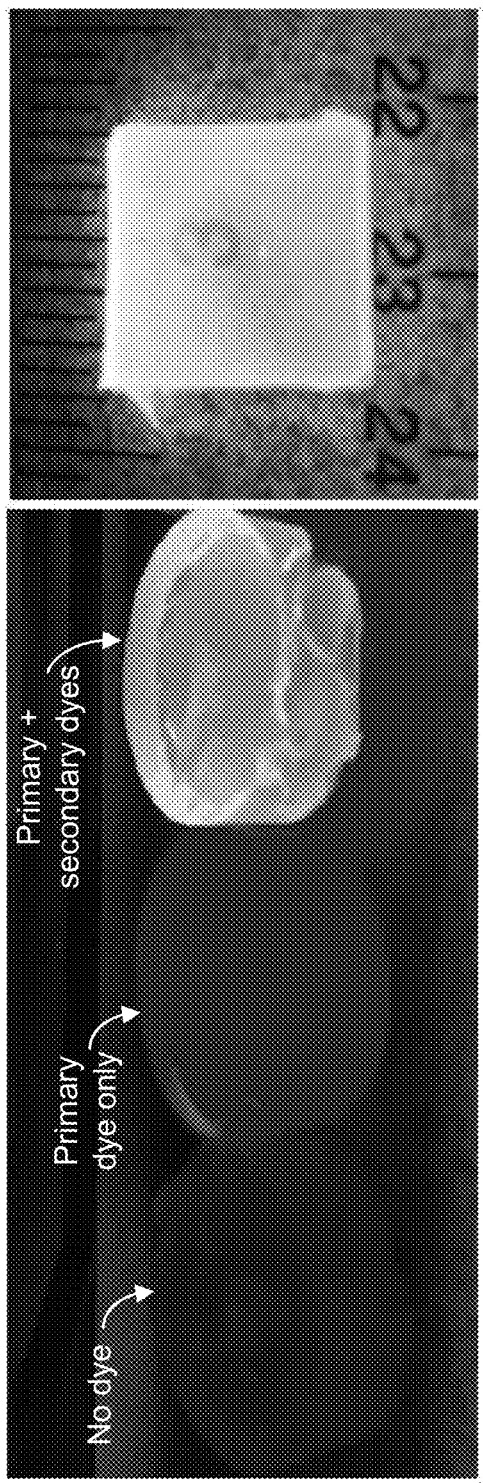

OPTICALLY TRANSPARENT 3D PRINTED POLYSILOXANE SCINTILLATORS

RELATED APPLICATIONS

This application claims priority to U.S. Provisional Patent Application No. 63/011,788 filed Apr. 17, 2020, which is herein incorporated by reference.

This invention was made with Government support under Contract No. DE-AC52-07NA27344 awarded by the United States Department of Energy. The Government has certain rights in the invention.

FIELD OF THE INVENTION

The present invention relates to radiation detection, and more particularly to polysiloxane-based inks for polysiloxane scintillators capable of detecting ionizing radiation, and methods of making and using the same.

BACKGROUND

Scintillation detectors serve as the backbone of radiation detection. Although some of the most cost efficient and most expensive radiation detectors use different technologies, the majority of applied radiation detectors rely on scintillation to measure radiation energy at reasonable cost and robustness. Basic scintillation detectors identify when radiation has deposited energy inside the scintillator and how much energy was deposited. These detectors allow users to detect the presence and spectrum of radiation. The spectrum can be used to identify the radiation source, including distinguishing threat from non-threat sources. However, this source identification is limited by the energy resolution of the detector, the presence of shielding around the source, radioactive backgrounds, and short measurement durations or long distances, which each reduce the statistical precision of the measurement. Advanced detectors augment this basic design by adding capabilities that detect more parameters about the radiation and its source.

To enhance DNN (U.S. Office of Defense Nuclear Nonproliferation) applications, more advanced detectors distinguish neutrons from gamma-rays, as neutrons are an indicator of SNM (special nuclear material) sources. One approach to this is pulse-shape discrimination (PSD), a technique in which the scintillating material is doped with fluors that produce a distinct pulse shape when hit with fast neutrons. Solid PSD plastic scintillators are a topic of active research and have seen significant improvements in their scale, light output, and discrimination ability in recent years. However, they are still limited in scale and elements larger than about 20 cm are difficult to produce. Liquid PSD scintillators are more available, but liquid-based detectors are less robust and less portable than solid detectors. PSD detectors of either type also utilize expensive fast electronic instrumentation that further raises their cost.

Another approach to neutron identification involves doping the scintillating material with a substance such as gadolinium or lithium-6 that produces additional radiation when it captures a thermal neutron. This approach is similar to that of the now-standard helium-3 detectors, but doped scintillators have not yet exhibited neutron-gamma separation competitive with helium-3. Thus, identification of neutron radiation for SNM detection currently is limited to the choice between small and expensive solid PSD detectors, less robust and still expensive liquid PSD detectors, or neutron capture detectors with limited efficiency.

Other advanced scintillation detectors allow the user to identify the location of radiation interactions. These detectors typically employ multiple, separately-instrumented detector volumes. The location of the radiation interaction can be determined by observing the detector volume having the radiation interaction. Unfortunately, the ability to identify the precise location of the interactions is limited by the size of a single scintillator volume: using smaller volumes enables more precise location-finding, but increases the total number of volumes, thereby increasing the cost of instrumenting each volume separately. The number of volumes and associated cost also rises if the detector is subdivided along more dimensions, making 3D position-finding particularly difficult and expensive.

Some detectors are able to locate an interaction within a single volume using a double-ended instrumentation. However, this capability requires costly fast electronics and only works in a single dimension. Thus, a detector that can precisely locate radiation interactions without using many separately instrumented volumes-particularly if such a detector could do so along multiple dimensions and without fast electronics-will vastly improve both the accuracy and cost-benefit of detection activities.

What is needed, and absent from the art, is development of an optically transparent scintillator capable of having fine and/or periodic features comprised of multiple materials for enhanced scintillator capability, such as directional sensing of radiation.

SUMMARY

In one aspect, an ink for forming a scintillator product includes a phenylated siloxane polymer having at least one functional group per molecule for crosslinking, a filler having a refractive index about matching a refractive index of the phenylated siloxane polymer, where the refractive indices are within about 5% of one another, a rheology modifier, and at least one fluorescent dye.

In another aspect, a scintillator product includes a three-dimensional (3D) structure having physical characteristics of formation by additive manufacturing, where the structure includes a material comprising a phenylated siloxane polymer, a filler having a refractive index about matching a refractive index of the phenylated siloxane polymer, where the refractive indices are within about 5% of one another, and at least one fluorescent dye. In addition, the scintillator product is optically transparent.

In yet another aspect, a method of forming an optically transparent scintillator product includes extruding an ink for forming a three-dimensional (3D) structure using an additive manufacturing technique and curing the 3D structure for forming the optically transparent scintillator product. The ink is a scintillator material including a phenylated siloxane polymer having at least one functional group per molecule for crosslinking, a filler having a refractive index about matching a refractive index of the phenylated siloxane polymer, where the refractive indices are within about 5% of one another, and at least one fluorescent dye.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 10A is an image of monolithic 3D printable polysiloxane scintillators under UV excitement having different emission colors and intensities, according to one aspect of an invention.

FIG. 10B is an image of a monolithic 3D printable polysiloxane scintillator under UV excitement having a 525 nm emission color, according to one inventive aspect.

DETAILED DESCRIPTION

Figures 1A, 1B:
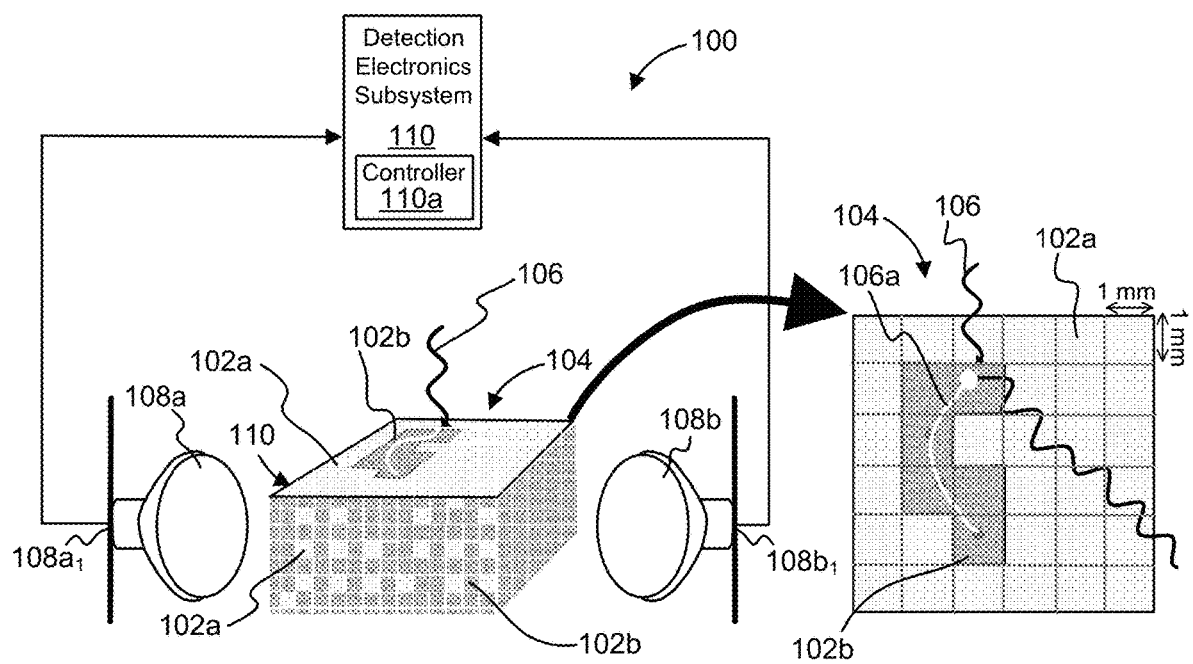
FIG. 1A is a schematic diagram of a high level perspective illustration of a scintillator system.
FIG. 1B is a plan top view of the scintillator of FIG. 1A illustrating how gamma radiation passes through and deposits energy in four of the cubes of the scintillator structure.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Further, as used herein, all percentage values are to be understood as percentage by weight (wt. %), unless otherwise noted. Moreover, all percentages by weight are to be understood as disclosed in an amount relative to the bulk weight of an organic plastic scintillator material, in various approaches.

Unless expressly defined otherwise herein, each component listed in a particular approach may be present in an effective amount. An effective amount of a component means that enough of the component is present to result in a discernable change in a target characteristic of the ink, printed structure, and/or final product in which the component is present, and preferably results in a change of the characteristic to within a desired range. One skilled in the art, now armed with the teachings herein, would be able to readily determine an effective amount of a particular component without having to resort to undue experimentation.

The present disclosure includes several descriptions of exemplary "inks" used in an additive manufacturing process to form the inventive optics described herein. It should be understood that "inks" (and singular forms thereof) may be used interchangeably and refer to a composition of matter comprising a plurality of particles coated with/dispersed throughout a liquid phase such that the composition of matter may be "written," extruded, printed, or otherwise deposited to form a layer that substantially retains its as-deposited geometry and shape without excessive sagging, slumping, or other deformation, even when deposited onto other layers of ink, and/or when other layers of ink are deposited onto the layer. As such, skilled artisans will understand the presently described inks to exhibit appropriate rheological properties to allow the formation of monoliths and/or fine structures via deposition of multiple layers of the ink (or in some cases multiple inks with different compositions) in sequence.

The following description discloses several preferred structures formed via direct ink writing (DIW), extrusion freeform fabrication, or other equivalent techniques (collectively referred to as DIW herein) and therefore exhibit unique structural and compositional characteristics conveyed via the precise control allowed by such techniques. The physical characteristics a structure formed by DIW may include having lower layers of the structure are slightly flattened, slightly disfigured from original extrusion (e.g., see slight droop of the filament in FIG. 9A), etc. by weight of upper layers of structure, due to gravity, etc. The three-dimensional structure formed by DIW may have a single continuous filament that makes up at least two layers of the 3D structure.

As also used herein, the term "about" when combined with a value refers to plus and minus 10% of the reference value. For example, a length of about 10 nm refers to a length of 10 nm±1 nm, a temperature of about 50° C. refers to a temperature of 50° C.±5° C., etc.

As additionally used herein, a material that is "optically transparent" refers to a material that is substantially free of optical grain boundaries or light scatter defects, such that the material is capable of transmitting at least about 90% of incident light. In one approach, optical transparency may be measured as the material having scattering of light less than about 5% per cm.

The description herein is presented to enable any person skilled in the art to make and use the invention and is provided in the context of particular applications of the invention and their requirements. Various modifications to the disclosed approaches to inventive aspects will be readily apparent to those skilled in the art upon reading the present disclosure, including combining features from various approaches to create additional and/or alternative approaches thereof.

Moreover, the general principles defined herein may be applied to other approaches and applications without departing from the spirit and scope of the present invention. Thus, the present invention is not intended to be limited to the approaches shown but is to be accorded the widest scope consistent with the principles and features disclosed herein.

The following description discloses several preferred inventive aspects of ink formulations for forming optically transparent 3D printed polysiloxane scintillator material and/or related systems and methods.

In one general aspect, an ink for forming a scintillator product includes a phenylated siloxane polymer having at least one functional group per molecule for crosslinking, a filler having a refractive index about matching a refractive index of the phenylated siloxane polymer, where the refractive indices are within about 5% of one another, a rheology modifier, and at least one fluorescent dye.

In another general aspect, a scintillator product includes a three-dimensional (3D) structure having physical characteristics of formation by additive manufacturing, where the structure includes a material comprising a phenylated siloxane polymer, a filler having a refractive index about matching a refractive index of the phenylated siloxane polymer, where the refractive indices are within about 5% of one another, and at least one fluorescent dye. In addition, the scintillator product is optically transparent.

In yet another general aspect, a method of forming an optically transparent scintillator product includes extruding an ink for forming a three-dimensional (3D) structure using an additive manufacturing technique and curing the 3D structure for forming the optically transparent scintillator product. The ink is a scintillator material including a phenylated siloxane polymer having at least one functional group per molecule for crosslinking, a filler having a refractive index about matching a refractive index of the phenylated siloxane polymer, where the refractive indices are within about 5% of one another, and at least one fluorescent dye.

A list of acronyms used in the description is provided below.

3D Three-dimensional
3HF 3-hydroxyflavone
APID anisotropic particle identification
Bis-MSB 1,4-bis(2-methylstyryl)benzene
C Celsius
Cs cesium
DIW direct-ink writing
DLP Digital light processing
DPA 9,10-diphenylanthracene
kg kilogram
μm micron
m meter
mm millimeter
MDAC 7-diethylamino-4-methylcoumarin
MeV mega electron volts
m-TP m-terphenyl
nm nanometer
α-NPO α-naphthylphenyloxazole
PID MMSS Particle-identifying mixed material scintillator structures
PiPS pillars of plastic scintillators
PL photoluminescence
ppm parts per million
PPO 2,5-diphenyloxazole
PR position resolving
PSD Pulse Shape Discrimination
PVT poly(vinyltoluene)
SLA stereolithography apparatus
SNM Special nuclear materials
TPB 1,1,4,4-tetraphenylbutadiene
TMQ 2",3,3',3'''-tetramethyl-p-quaterphenyl
UV ultraviolet
wt. % weight percent In response to the limitations of conventional scintillator systems, optical lattices have emerged as a tool for locating interactions in three dimensions within a scintillation detector with reduced instrumentation. One type of detector uses an arrangement of scintillating cubes having thin gap separations. Light produced in one cube undergoes total internal reflection at the interface between the plastic and the air within the gap, thereby resulting in the light preferentially traveling to cubes in the same X, Y and Z rows as the origin cube. The optical lattice identifies which volume the interaction was in by instrumenting each row in three dimensions, and thus obviating the need to instrument each individual cube. For example, a 10×10×10 optical lattice would need 30 instruments instead of 1000. However, current optical lattices rely on careful hand assembly, which limits the scale of these detectors and significantly compounds the expense. This technological innovation may benefit from a practical and cost-effective technique to produce optical lattices with smaller cubes in greater numbers than has previously been achieved.

Moreover, recent advances in material and construction of scintillator structures tend to interfere with optimal collection of the light produced in the scintillator, thereby reducing the energy resolution of these detectors. The amount of light initially emitted is a property of the chemistry of the scintillating material, but the detector construction and design play a major role in determining how much of the light emitted is collected onto sensors instead of leaked or lost to absorption in the detector materials. The increased amount of light observed the better the statistical precision of the measurement of the radiation energy. In general, optimizing the light collected, that is, the precision of the energy measurement, competes with integrating advanced scintillation-detection features. By easing this tradeoff, innovations that improve the ability to collect light indirectly enable other advanced capabilities.

The existing advanced scintillating materials owe their success to substantial effort to master the complex chemistry behind conventional methods of scintillator production. Whether producing a plastic, ceramic, or crystal scintillator, tight control of the chemistry is critical to prevent spoilage of the material during its production. The challenge increases for larger pieces of scintillating material. For example, plastic scintillators are typically produced by bulk polymerization, which is an exothermic process. As the piece size grows larger, the surface area to volume ratio makes dissipating the heat of polymerization more difficult. As the process complexity grows with the piece size, production yields drop, making large pieces particularly expensive. Conventional methods such as casting or crystal growth also are limited in their ability to produce complex form factors directly, and so instead typically produce solid blocks that must be machined to the desired shape. The additional machining critical in these conventional methods represents an additional manufacturing operation which further adds to the production costs.

Conventional solid organic scintillators such as plastics and crystals possess significant quantities of hydrogen in their composition, making them amenable for fast neutron detection via proton recoil reactions. These materials are typically produced as monoliths by bulk polymerization or crystal growth methods. However, standard plastic scintillators typically include stringent prolonged curing methods, for example, curing over several weeks in a strictly inert atmosphere. Single crystals of even moderately (>1 cm) sized scintillators typically need to be cured for several days, even at aggressive growth rates.

Recent research has shown bulk structures of various polysiloxanes is a scintillator material capable of pulse shape discrimination at dye loading amounts lower than that used in typical PVT-based scintillators. However, they typically suffer from poor mechanical properties and are subject to defects such as bubbling, cracking, and other defects. Moreover, additive manufacturing of polysiloxane technology is developing as an area of interest for scintillator fabrication. Stereolithography (SLA), sometimes known as digital light processing (DLP), is a common technique for producing acrylic-based plastics but has not successfully been deployed using polysiloxanes due to the difficulty in adapting traditional platinum-based curing chemistries to UV-curing processes. In addition, various photoinhibitors used for dimensional control in SLA absorb in similar regions as scintillation dyes, thus interfering with the scintillation process.

Various aspects described herein include the preparation and fabrication of optically transparent polysiloxane-based scintillators capable of having fine and/or periodic features. Methods described herein use extrusion-based additive manufacturing techniques, e.g., direct ink writing (DIW), for forming structures having physical characteristics of 3D printing, e.g., fine features in a micron scale, uniform features, periodic features, etc. In preferred approaches, an optically transparent polysiloxane-based multimaterial scintillator having fine, periodic features is not only capable of detecting ionizing radiation, but also may be capable of directional sensing, pulse shape discrimination, etc. In some approaches, ionizing radiation refers to gamma rays, beta particles, alpha particles, neutrons, etc. The polysiloxane-based scintillators are preferably designed not to detect infrared light, radiowaves, magnetic fields, etc.

Direct ink writing a scintillating ink, as described herein, allows fabrication of an extruded scintillator in its final shape onto a substrate without limit to size. Moreover, the scintillating ink allows a wide variety of siloxane chemistry. Direct-ink-writing affords the possibility of creating fine physical features (<1 mm) with single and multicomponent features not attainable by standard polymer casting methods. For example, a primary advantage of DIW over conventional organic scintillator fabrication techniques is the ability to produce fine structural features from either single (homogeneous) or multiple (heterogeneous) scintillator feedstocks within a single active volume. Structured, heterogenous features allow scintillators to encode information about incident radiation that conventional scintillators cannot, thereby enhancing detection capabilities beyond what was heretofore attainable.

As an alternative approach to Pulse Shape Discrimination (PSD) for detection of ionizing radiation, various inventive aspects described herein may be useful in applications that use a geometry approach for detecting ionizing radiation. The methodology of particle-identifying mixed material scintillator structures (PID MMSS) includes very fine resolution features of the scintillator geometry are desirable for encoding information about the incoming radiation.

FIGS. 1A-1B illustrate an example of a system using PID MMSS. As shown, a mixed material scintillator system 100, hereafter MMSS 100, may include a plurality of like-sized cubes 102a, 102b formed immediately adjacent one another, which cooperatively form a scintillating structure 104. The cubes 102a, 102b may be made from two different scintillating materials. The dimensions of the cubes may vary to meet the needs of a specific application. In one example as shown in FIG. 1B, cubes 102a, 102b may have dimensions of 1 mm³. In addition, the configuration of the cubes may vary. As shown in FIG. 1A, the cubes 102a, 102b may be arranged in a uniform, alternating fashion. The overall shape of the scintillator system may be constructed to meet the needs of a specific application. In preferred systems, an overall shape of the scintillator system is rectangular, square, etc.

Each of the one type of cubes 102a may be comprised of scintillating material that produces a first color of light in response to received radiation 106 passing therethrough, while each of the other type of cube 102b produce a second different color of light in response to radiation 106 passing therethrough. For example, the one type of cube 102a may include material that produces green light, and the other type of cube 102b may include material that produces blue light. These materials and colors are by way of example only and are not meant to be limiting in any way; material producing other colors of light may be used. The use of two dissimilar materials for the cubes 102a, 102b enables the scintillator structure 104 to provide output signals that distinguish between gamma and neutron radiation being received. In some approaches, the dissimilar material for the cubes 102a, 102b enables the scintillator structure 104 to provide signals for location of the path of radiation 106 being received within the structure 104.

For example, a neutron produces a short ionizing tracks in the detector (e.g., 20 microns from a 1 MeV neutron recoil), and may remain entirely within one cube 102a or 102b. Alternatively, when a gamma ray hits one of the cubes 102a, 102b, the gamma ray will produce a recoil electron that deposits energy over a track 106a spanning several adjacent cubes 102a, 102b, as shown in FIG. 1B that shows a plan view of the scintillator structure 104 of FIG. 1A. The radiation 106 of the gamma ray produces a scintillating signal from the energy deposited along the track 106a as a mixture of the two light colors of the two different cubes 102a, 102b. Thus, the particle type may be identified by determining if the scintillation signal from the irradiation 106 of the scintillator structure 104 has produced light of only one color (e.g., indicating a neutron hitting a single cube 102a, 102b) or light having components of both colors (e.g., indicating a gamma's track 106a hitting multiple cubes 102a and 102b).

In various approaches, analysis of the signal produced by the scintillator structure 104 may include incorporating two light sensors 108a, 108b as part of the system 100. A light sensor 108a may include a green light sensitive photomultiplier tube, and a second light sensor 108b may include a blue light sensitive photomultiplier tube. The sensors 108a, 108b may be positioned proximate, adjacent, etc. the surface 110 of the scintillator structure 104. In more approaches, the sensors include light sensors used in conventional scintillators as would be understood by one skilled in the art.

In one example as illustrated in FIG. 1A, the light sensors 108a, 108b generate electrical output signals at their outputs $108a_1$, $108b_1$ which are input to a detection electronics subsystem 110. The detection electronics substation 110 may be an integral portion of the system 100 (e.g., housed in a housing which also includes the scintillator structure 104), may be fully independent subsystem which is coupled via suitable electrical connections to the light sensors 108a, 108b to receive the outputs $108a_1$, $108b_1$, etc. The detection electronics system 110 may optionally include a controller 110a, as well as suitable memory (e.g., RAM or ROMO, not shown), as well as an optional display system (e.g., LCD, CRT, LED indicators, etc., not shown). The detection electronics subsystem 110 interprets the signals from the light sensors 108a, 108b to determine whether neutrons or gamma radiation is being received by the system 100 and provides information to a user to indicate the type of radiation, if any, has been detected by the scintillator structure 104. Accordingly, a central function of the detection electronics subsystem 110 is to turn the received signal into a digital record in memory. This "digitalization" can happen "fast" (recording the state of the signal every nanosecond, or even more frequently) or "slow" (recording the signal about every 100 nanoseconds or even less frequently).

In one inventive aspect, as described herein, the design of the scintillator structure having hundreds, thousands, etc. cubes 102a, 102b may be constructed using an additive manufacturing system. In one approach, a three-dimensional (3D) printer may be used to construct an open lattice of cubes of one material, and a second material may be poured in a liquid form into the interstitial spaces of the open lattice, and then the second material may be cured to a solid. In another approach, a method of 3D printing may include a mixing nozzle that combines a base material with one of two types of fluors to produce cubes of either material, a compositional gradient, etc. In yet another approach, the scintillating materials may be produced conventionally, e.g., chopped, powdered, etc., and suspended in a clear ink for printing a 3D structure at room temperature. The wider choice of materials may be available including materials that tend to not be tolerant of higher temperatures. In one approach, an additive manufacturing technique including a pick-and-place assembly may allow conventionally produced cubes to be assembled into an appropriate structure with close to zero chemical or physical disruption of the material.

Particle Identifying (PID) MMSS

Additive manufacturing (AM) fabricated MMSS detectors, such as the system 100 in FIG. 1A, yield the opportunity for creating specific particle-identifying (PID) mixed material scintillator structures. As with the example of the system 100 in FIG. 1A, a PID MMSS may use structures tailored to a given application. for example, the size of the cubes 102a, 102b may be increased or decreased. For example, in one approach, AM techniques may fabricate structures having fine features in a range of 10 s of microns and smaller. In one approach, cubes 102a, 102b may be configured with alternating scintillating materials, e.g., alternating blue-emitting and green-emitting materials, alternating fast and slow emitting materials, etc. In yet another approach, two different materials may include low light yielding and high light yielding materials. In more approaches, combinations of the foregoing approaches having different materials may be incorporated in the scintillator structure 104.

Anisotropic PID for Thread Source Search

Figure 2:
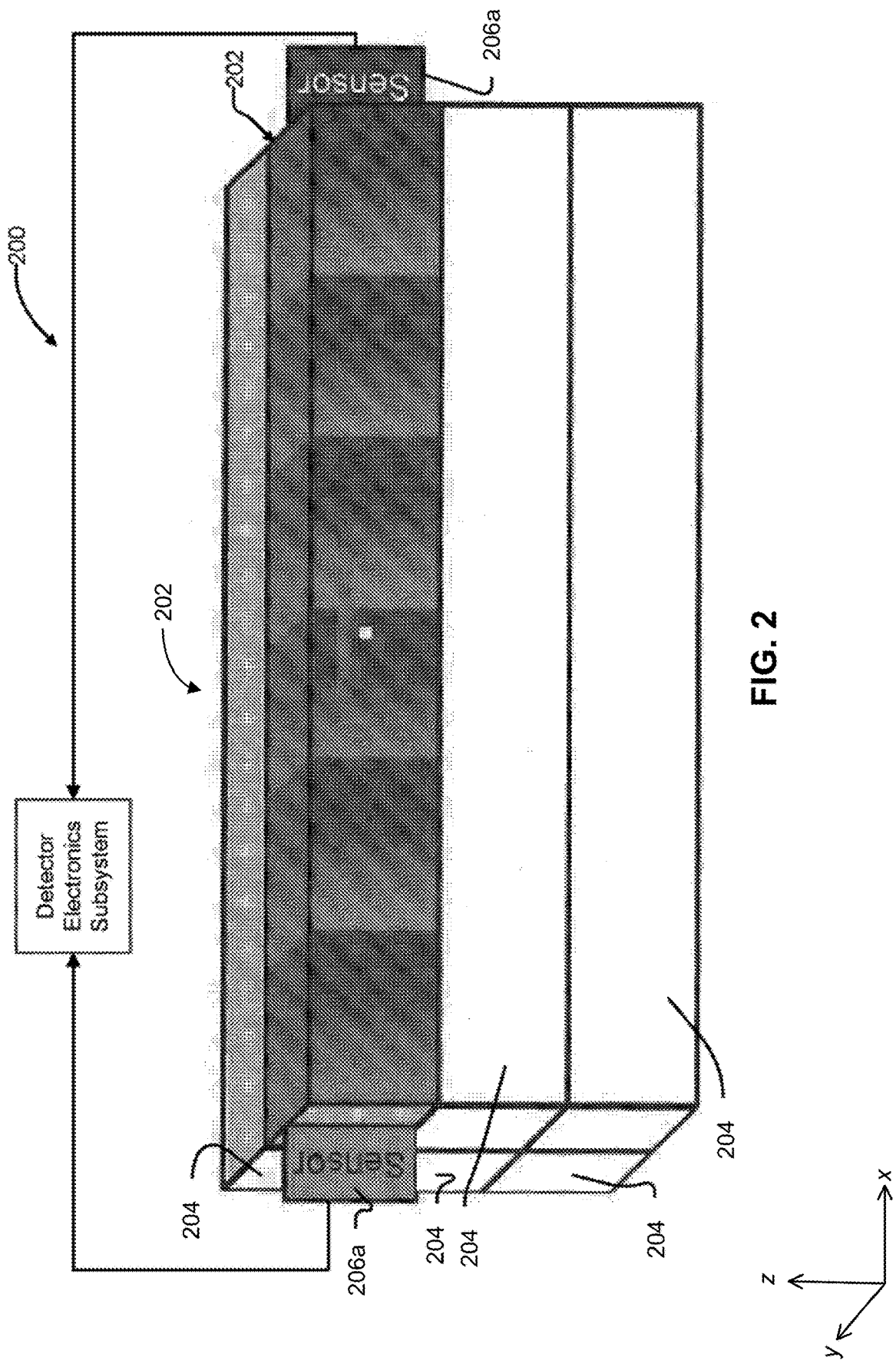
FIG. 2 is a perspective view of a system illustrating a MMSS scintillator structure adapted for use in a scatter camera application.

In one approach to an inventive aspect, a scintillator system may measure irradiation rate and energy in angle-selective segments (e.g., neutron, gamma ray, etc.). for example, the scintillator system may point to a location of a fissile neutron source. As shown in FIG. 2, an anisotropic particle identification (APID) MMSS system 200 includes a scintillator structure 202 having a PID checkerboard arrangement of long rectangular prism segments 204. In some approaches, the prism segments 204 may be extended slightly in the vertical direction along the z-axis (e.g., 50 μm×500 μm×100 μm). In another approach, a 2×3 array of prism segments 204, as shown in FIG. 2, includes 10×10 prism segment scintillator structure 202.

The prism segments 204 may be constructed with a variety of materials. In one approach, the prism segments 204 may include blue/green poly(vinyltoluene) (PVT). The scintillator structure 202 may include six or more prism segments 204, each with two light sensors 206a, 206b. In one approach, a scintillator structure may include ten prism segments. In various approaches, each prism segment 204 may be aligned in a different horizontal direction, parallel to the x-axis, to maximize sensitivity to a hidden source in any horizontal direction, such that the hidden source is on-axis for one segment and off-axis for others. Additional segments may be added and aligned at a vertical angle to increase sensitivity to sources below or above the plane of the scintillator structure 202.

In one aspect, an APID MMSS 200 may be used to determine the location of a source with a known, or approximately known, spectrum, e.g., a fissile source. For example, for an APID MMSS 200 positioned to point at the source, high-energy proton recoils may be observed as single-color events, and the proton recoil track may remain within the long axis of a scintillator structure 202 of the APID MMSS system 200. Alternatively, for an APID MMSS system 200 positioned at a small angle relative to the source, intermediate energy proton recoils may be observed as single-color events, but high energy recoils may be observed as two-color events. As the angle of the APID MMSS system 200 position to the source decreases, the maximum energy visible as a single-color event decreases.

Using an array of APID MMSS systems 200, the direction of the source relative to the systems may be determined by identifying the APID MMSS system 200 that observes the highest energy proton recoils. Further analysis may narrow the location by comparing the energies observed in all segments of a scintillator structure 202 compared to the expectation for a source at any position. The system will allow for finer resolution of the source location.

In another approach of an inventive aspect, a scintillator system may be used for making a target measurement of neutron and gamma hit location, energy, and time. For example, a system may be able to identify the location and incident energy of both neutrons and gamma rays simultaneously, and further to allow for location and isotope identification of an unknown source.

In one approach, a scintillator structure may include a position resolving (PR) scintillator structure having a gradient composition design. As illustrated in FIG. 2, the gradient may be arranged such that the change in composition indicates the location within the scintillator structure along one or more axes or according to an arbitrary nonlinear mapping. Radiation interacting with this structure will produce scintillator light with properties, such as wavelength or pulse shape, determined by the material at the point in the gradient where the interaction occurred. Light sensors able to detect these properties will then be able to measure the location of the radiation interaction. Using the PR MMSS structure without any other method of locating the radiation interaction location may measure that location to within about 1 cm in a bar having a length of 20 cm–.

In one approach, shown in FIG. 2, the arrangement of the gradient may be periodic. With this arrangement, the approximate location of the radiation interaction is determined using conventional techniques such as comparing the difference in light intensity and timing arriving in sensors on each end of the scintillator piece. These conventional techniques can determine the position to within approximately 1 cm in a 20 cm bar. Using that approximate location as well as the additional information provided by the PR MMSS gradient, a precise location may be determined. This periodic PR MMSS approach may determine the location to within approximately 1 mm in a 20 cm bar. having a shape of a long pillar, e.g., dimensions of about 1 cm×1 cm×10 cm, as illustrated in FIG. 2. This design can, in one approach, be incorporated into a scatter camera In one approach, a PR MMSS may augment the ability of scatter cameras to identify the location of interactions, thereby increasing the precision of the derived direction and energy of the incoming radiation.

In one approach, a pillars-of plastic-scintillators (PiPS) scatter camera design includes an array, combination, etc. of a series of prisms 204 as illustrated in FIG. 2. These prisms may have the shape of long pillars, e.g., dimensions of about 1 cm×1 cm×10 cm. In one approach, the PiPS design can be augmented with PR MMSS material, such that the detector may precisely determine the location of radiation interactions in the x-axis (lengthwise down the pillar). The PiPS design then indicates the location of the interaction in the other two (y and z) axes through observing which pillar detected light. In one approach, this design may be used to detect the location of multiple interactions of a single radioactive particle, where the particle scatters in multiple pillars of the PiPS. Precise information of those scatter locations, as provided by the PR MMSS PiPS design may be analyzed to yield the incident energy and direction of that particle.

In one approach, the PR-MMSS-PiPS scatter camera may also employ pulse-shape discrimination (PSD) to separately identify gamma and neutron signals. The system may allow independent measurements of the neutron and gamma spectra. Moreover, the system may determine the location of a weak neutron source in the presence of a high ambient gamma background.

According to various approaches to one inventive aspect, scintillator structures having very fine features may be fabricated using additive manufacturing techniques. For instance, when an alpha particle goes through structure having very fine features, e.g., 50 microns (µm) in diameter, the alpha particle may only hit one of the features, because of how deep the alpha particle penetrates the material. Alternatively, a gamma ray penetrating the material may hit about a hundred 50 µm features because the gamma ray, and the recoil electron, has a much larger range than the alpha particle. Thus, a different structure of emission will be detected with the radiation sensor depending on the incoming radiation. These fine structures can enhance the detection and particle discrimination capabilities of scintillator materials.

As noted above, siloxane polymers, e.g., polysiloxanes, have not previously found much success as printed scintillator materials. Some reports have demonstrated polysiloxane scintillator materials produced primarily by bulk casting or sol-gel methodologies, but these materials had poor mechanical properties, and were not amenable to 3D printing technology.

In various inventive aspects as described herein, an ink for forming a scintillator product includes a phenylated siloxane polymer having at least one functional group per molecule for crosslinking, a filler having a refractive index about matching a refractive index of the phenylated siloxane polymer, a rheology modifier, and at least one fluorescent dye. Preferably, the refractive indices of the filler and the phenylated siloxane polymer are within about 5% of one another but are ideally as closely matched as possible. Various inventive aspects disclosed herein include formulations for direct-ink writeable polysiloxane scintillators, formulation preparation, and printing methodology. In addition, some inventive aspects include polysiloxane scintillator materials and related systems, and the optical and scintillation characterizations of these materials.

One inventive aspect includes a 3D-printed polysiloxane based scintillator. The material is based on the use of an organic polysiloxane resin base, crosslinker, catalyst, fillers, fluorescent dyes, and rheology modifiers, combined to create a 3D-printable scintillating ink. Other materials such as chain extenders, inhibitors, solubilizers, and nuclides to enhance radiation detection sensitivity can be added as desired. The ink can be printed using suitable extrusion methods such as direct ink writing to produce a part with the desired geometry, composition, and structural features. Direct-ink-writing also permits use of active mixing to produce parts with controlled gradient compositions, a feature which is not readily accessible using conventional methods.

Various components usable in inks described herein are described below. Such inks may include some or all of the general components, each present in an effective amount for the purpose for which added.

In various approaches, the ink may be characterized as a material being optically transparent after curing. As described herein, optically transparent may be defined as a material that is substantially free of optical grain boundaries or light scatter defects, e.g., greater than 95% free, preferably greater than 99% free.

Polysiloxane Resin

Polysiloxanes (also referred to as siloxane polymers as described herein) offer unique properties as scintillator materials. In addition to the known radiation hardness, chemical inertness, and thermal stability, polysiloxanes have robust chemistry and can be cured in only hours in ambient atmosphere.

Polysiloxane materials have extremely versatile chemistry: small changes in the formulation may result in pronounced changes physical and mechanical properties of the material. Properties such as modulus and impact strength may be easily tuned for a specific application without significantly affecting the radiation-sensing properties. Polysiloxane materials preferably are synthesized with a tunable degree of phenylation. In exemplary approaches, a phenylated polysiloxane provides the following physical characteristics to the scintillator mixture: improves scintillation yield, improves solubility of organic scintillation dyes, provides a mechanism by which the refractive index can be tuned to match that of reinforcing fillers to produce optical-quality parts, etc. For example, the phenyl content in the siloxane polymer may be tuned so that the refractive index of the siloxane polymer matches the refractive index of the filler, e.g., silica. In some cases, siloxane polymers having a higher phenyl content tend to also have higher refractive indices that prevent index matching to silica, thereby resulting in a reduced, eliminated, etc. transparency, e.g., opaque, nontransparent, cloudy, etc.

In preferred approaches, the molecular weight of the phenylated siloxane polymers is in a range of 10,000-50,000 g/mol. In preferred approaches, polysiloxane resins include some degree of phenylmethylsiloxane or diphenylsiloxane groups. In preferred approaches, a polysiloxane resin includes about 15 to 17 mol. % of diphenyl units for providing a desired refractive index of the resin that matches to silica, e.g., filler. The remaining functional groups on a polysiloxane resin having 15 to 17 mol. % diphenyl units may include primarily dimethyl units. However, a polysiloxane resin having a greater amount of phenylation (for example, with poly(phenylmethylsiloxane) has more phenyl groups (~50% phenylation) and also tends to have a higher refractive index that may likely prevent a refractive index match to silica. Thus, without being bound to any theory, it is believed that although a higher phenyl content would likely enhance scintillation performance, if the degree of phenylation causes the refractive index of the polysiloxane resin to be greater than the refractive index of silica (i.e., a mis-matched silica), then the resulting scintillator part would be non-transparent; and lack of transparency would likely decrease scintillation performance. Thus, the criticality of tuning the degree of phenyl content of the polysiloxane resin depends on achieving the best match of refractive indices between the polysiloxane resin and the silica filler.

At very low temperatures, e.g., below −45° C., a phenylated siloxane polymer base may prevent crystallinity of the resin. Moreover, the phenyl groups tend to collect the bulk of the usable energy from the incident radiation. The phenyl groups allow conversion of the energy of the incident radiation into a useable form. Any energy that is deposited on a group other than a phenyl group or fluorescent dye tends to be ultimately lost during detection.

In one aspect of the invention, suitable organic polysiloxane resin inks include a phenylated siloxane polymer having at least one functional group for crosslinking for transforming the phenylated polysiloxane resin ink into a solid. In some approaches, functional groups for crosslinking play a role in increasing rigidity of the printed structure. In various approaches, the phenylated siloxane polymer has at least one functional group per molecule for crosslinking such as: a vinyl group, a thiol (e.g., mercapto) group, an epoxy group, an amine group, a hydride group, a silanol group, an alkoxy group, a carbinol group, an acrylate group, a methacrylate group, an acetoxy group, a chlorine group, a dimethylamine group, or a combination thereof, etc. As described herein, the refractive index of the functionalized polysiloxane is matched to the refraction index of the silica filler. In some approaches, the functionalized polysiloxane resin having a specific refractive index may be obtained commercially. In other approaches, the functionalized polysiloxane resin having a specific refractive index may be synthesized.

The functional groups of the polysiloxanes may be positioned on the ends of polysiloxanes, in the repeat units, etc. In an exemplary approach, a phenylated siloxane polymer has at least one vinyl-terminated functional group per molecule for crosslinking e.g., divinyl-terminated phenylated polysiloxanes, etc. In other approaches, the functional group for crosslinking may be a repeat unit of the siloxane polymer, e.g., poly(methylvinyl-co-dimethyl)siloxane.

Other suitable polysiloxanes include monovinyl-terminated polydimethylsiloxanes, divinyl-terminated polydiphenylsiloxanes, and polymethylvinylsiloxanes. One or more types and/or molecular weights of polysiloxane resins can be combined in effective amounts to obtain the desired rheological and material properties.

In some approaches, in ink may include an amount of phenylated siloxane polymer in a range of 65 wt. % to about 90 wt. % relative to the total weight of the ink and may be higher or lower. In preferred approaches, an amount of phenylated siloxane polymer may be in a range of about 70 wt. % to about 80 wt. % relative to the total weight of the ink.

Crosslinker

Crosslinkers allow the cure chemistry to transform the material from a liquid to a solid. In some approaches, the functional group for crosslinking determines the catalyst and/or initiator included in the polysiloxane ink. In various approaches, an ink having polysiloxane resins with divinyl functional groups may include suitable crosslinkers such as any small molecule or polymer including two or more silane (Si—H) functional groups per molecule. Examples include polyhydrogenmethylsiloxane, poly(dimethyl-co-hydrogen methyl)siloxane, and phenylated derivatives of those molecules. Optimum properties are produced for silane-to-vinyl molar ratios greater than 1 and ideally in the range 1.5-2. The silane-containing polysiloxane molecules include adjacent or near-adjacent silane or methyl groups that cannot equally react due to steric or kinetic issues. In preferred approaches, polysiloxane scintillation inks do not include excess vinyl group defects. In preferred approaches, an excess of silane crosslinker is present in the polysiloxane scintillation ink. In inks with less silane crosslinker to polysiloxane resin may result in excess vinyl groups as dangling reactive ends thereby resulting in a scintillator having less-than-optimal mechanical properties and, possibly, may deteriorate over time.

In other approaches, inks having polysiloxane resins with functional groups for crosslinking may include a crosslinker appropriate for initiating crosslinking of the type of functional group, e.g., a thiol (e.g., mercapto) group, an epoxy group, an amine group, a hydride group, a silanol group, an alkoxy group, a carbinol group, an acrylate group, a methacrylate group, an acetoxy group, a chlorine group, a dimethylamine group. Some functional groups, such as acrylate, methacrylate, and epoxy, may polymerize with the same functional groups in the absence of a crosslinker, for example, acrylate functionalized polysiloxanes can react and polymerize with other acrylate functionalized polysiloxanes. Thus, in some approaches, an ink comprising an acrylate functionalized polysiloxanes may not include a crosslinker.

In various approaches, a crosslinker corresponds to the functional group for crosslinking. For example, and not meant to be limiting any way, a crosslinker for vinyl terminated siloxanes may include: mercaptopropyl terminated poly(dimethylsiloxane), poly(mercaptopropylmethylsiloxane-co-dimethylsiloxane) copolymer, poly(hydrogenmethylsiloxane), etc. Inks having alcohol terminated siloxanes may include the following crosslinker: vinyl-terminated polysiloxanes, polyurethanes, epoxies, etc.

Catalyst

In some approaches, the ink may include suitable catalysts including any metal catalyst that can facilitate a vinyl-silane coupling reaction or a vinyl-vinyl coupling reaction. These catalysts are known to those skilled in the art and include platinum, rhodium, palladium, tin, iridium, and others. In one approach, platinum may be a preferred catalyst since low amounts of platinum (a few ppm) at room temperature facilitate curing. In other approaches, tin may be used at a concentration of 1 to about 5% of total mass of ink. In another approach, rhodium may be used as catalyst for chemistry at higher temperatures.

In various approaches, an effective amount of catalyst to cause or induce curing is present in a range of about 1 ppm to about 5.0 wt. % of total ink. As would be understood by one skilled in the art, a concentration of an exemplary catalyst such as platinum is typically determined for 1 mole of catalyst per about 2500 moles of vinyl of the polysiloxane.

In some approaches, a phenylated siloxane polymer base with vinyl repeating groups, e.g., polysiloxane gumstocks such as polymethylvinylsiloxanes, curing can be accomplished using compounds that generate free radicals such as benzoyl peroxide, azobisisobutyronitrile, and di-tert-butyl peroxide.

Filler

In one exemplary approach, the polysiloxane scintillation ink includes fillers such as a nanometer-sized fumed silica and a copolymer of polysiloxane and polyether to form a scintillation ink that can be extruded by 3D printing techniques. A potential drawback of adding a powder fluorescent dye or filler to a semi-liquid resin, e.g., a polysiloxane resin, is the powder may cause scattering resulting in the material losing optical transparency, becoming opaque, etc. In a preferred approach, the refractive index of the polysiloxane resin is tuned to the refractive index of the silica filler such that the scattering is essentially eliminated, and the material is essentially transparent. According to various methods described herein, mechanically robust optically clear materials are formed using extrusion-based 3D printing techniques.

In various inventive aspects, filler materials may be present in the ink. In various approaches, the filler includes a solid filler. Some filler materials are reinforcing; others are non-reinforcing. Either or both types may be used in various approaches. Illustrative fillers include solid fillers such as silicas, fumed silicas, precipitated silicas, etc.

In some approaches, the ink may include resinous fillers such as silicone resins MT, MQ, DT, and DQ resins may be used, where each resin includes a configuration of silicon atoms having various numbers of oxygen units (e.g., M for a monofunctional unit, D for a bifunctional unit, T for a trifunctional unit, and Q for a tetrafunctional unit). In some approaches, resinous fillers may be included in the ink as a filler. Resinous fillers include silicate bonds similar to silica fillers, and the particles have organic groups on the surface, but the particles are small and irregular. Resinous fillers may participate in multiple bonds and, thus, are typically used as hardeners. Moreover, phenylated resinous fillers may be used to increase the scintillation yield. The resinous fillers may also be used as surfactants or solubilizers, depending on the surface chemistry. In preferred approaches, a polysiloxane ink may include a resinous filler in addition to a silica filler.

Most preferably, the ink includes a filler such as a nano-sized silica having a refractive index close to that of the surrounding cured scintillator to facilitate transmission and collection of scintillation light. An effect amount of the silica filler may be used to match the refractive index of the surrounding scintillator. In various approaches, a concentration of silica filler may be in a range of 10 wt. % to about 50 wt. % relative to the of total weight of the ink.

In other approaches, a resinous filler may be included in the ink to function as a siloxane polymer as described herein. In some approaches, a majority of the ink composition may be comprised of a resinous filler. The resinous fillers may be used as the polymer base in place of the polysiloxane resin. In one approach of the ink, the relative amounts of the siloxane polymer and the resinous filler may be related according to the following relationship:

$$Z = X + Y = \text{total amount of siloxane polymer} + \text{resinous filler,}$$

X=amount of siloxane polymer in the ink, and Y=amount of resinous filler in the ink, where Y is in a range of 2 wt. % of the ink up to a total replacement of the siloxane polymer in the ink. A concentration of the resinous fillers may be in a range of 2 wt. % of the ink to a total replacement of the polysiloxane base of the ink.

In some approaches, non-reinforcing fillers may be used to increase the volume of the polysiloxane scintillating ink. An effective amount of non-reinforcing filler may be used to cause the desired increase in volume of the ink.

Fluorescent Dyes

Fluorescent dyes are present to produce the scintillation light. In some approaches, the function of the fluorescent dyes is to collect the energy deposited on the phenyl groups of the polysiloxane. The fluorescent dyes may also be directly excited by the incident radiation, from which the excitation is localized on the fluorescent dye which can then relax and emit light. The dyes are thus a critical component that allows the transduction of the energy of the incident radiation into a useable form.

In the most general sense, the fluorescent dyes are classified as primary and secondary dyes. Primary dyes are used to collect energy deposited in the polymer base and directly from incident ionizing radiation. While any suitable primary dye may be used that effectively collects the excitation energy from the polymer base or incident radiation and can be dispersed in the polymer base to form an optically transparent material and are known to those skilled in the art, noteworthy examples include 2,5-diphenyloxazole (PPO); 2",3,3',3'"-tetramethyl-p-quaterphenyl (TMQ); p-terphenyl (p-TP); m-terphenyl (m-TP); α-naphthylphenyloxazole (α-NPO); 3-carbazolylpropyltriethoxysilane; and naphthalene. In some approaches, the primary dye may be combination of primary dyes.

In some approaches, a primary dye is present in the ink in an amount of about 0.5 wt. % to about 40 wt. % relative to the total weight of the ink. In one approach, primary dyes are preferably added in the concentration range 0.5 to about 30 wt. % relative to the total weight of the ink. In a preferred approach, a primary dye may be added in a concentration range from 0.5 to about 15 wt. % relative to the total weight of the ink. In some approaches, primary dyes may be added to as high as 40 wt. % with appropriate solubilizers.

Primary dyes can be used either alone or, more preferably, with a secondary dye. In some approaches, the fluorescent dyes, e.g., primary and/or secondary dyes, may be included in more than one ink to form patterns in the scintillator structure formed from more than one ink. The fluorescent dyes may be used separately in different inks, may be blended for use in one ink, may be blended in a pattern, e.g., a compositional gradient, to be used in one extruded ink, etc.

Secondary dyes are used to shift the wavelength of the emission. Secondary dyes function by collecting photons emitted from the primary dyes and re-emitting at longer wavelengths. This minimizes self-absorption, reduces Rayleigh scattering within the scintillator and increases the attenuation length, and in many cases improves the match of the final emission to the peak quantum efficiency of common photodetectors. For example, shifting the wavelength of the emission from 360 nm to 450 nm reduces the probability that the incoming radiation particle, e.g., photon, will scatter within the material; thus, a scintillation part may have a larger size while maintaining detection and light collection efficiency. A larger scintillator translates to a larger space to intercept radioactive particles.

Secondary dyes can be used alone (e.g., in parts used only for waveshifting), in conjunction with primary dyes, or in conjunction with other secondary dyes.

While any suitable secondary dye may be used, noteworthy examples of secondary dyes include 1,4-bis(2-methylstyryl)benzene (bis-MSB); 9,10-diphenylanthracene (DPA); 3-hydroxyflavone (3HF); 7-diethylamino-4-methylcoumarin (MDAC); 1,1,4,4-tetraphenylbutadiene (TPB); and others.

In various approaches, the at least one fluorescent dye of the ink includes a primary dye and a secondary dye. In some approaches, the secondary dyes may be present in the ink in an amount of about 0.05 wt. % to about 2 wt. % relative to the total weight of the ink. In some preferred approaches, the secondary dye may be present in the ink in an amount of about 0.1 wt. % to about 0.5 wt. % relative to the total weight of the ink.

Rheology Modifier

One or more rheology modifiers, e.g., thixotropic agent, thixo agent, etc., may be added to increase yield stress and induce shear-thinning behavior for optimal extrusion capabilities. In various approaches, any type of polyether copolymer may be used as a rheology modifier. Exemplary examples are polysiloxane-polyether copolymers, for example, BlueSil Thixo Add 22646. Without wishing to be bound by any theory, it is believed that the block copolymer of a polysiloxane and a polyether functions by the mechanism of the polysiloxane interacting favorably with the polysiloxane resin and the polyether interacting favorably with the silanol groups on the surface of the silica through hydrogen bonding. For example, in the presence of a rheology modifier such as polysiloxane-polyether copolymer, when there is no shear force on the material, the hydrogen bonds are present and prevent self-leveling of the material. e.g., the material behaves like a solid. When shear is applied, the hydrogen bonds break, then the material will flow. In preferred approaches, a thixo agent interacts with the silica filler of the ink to impart non-slumping properties of the ink during extrusion printing. Rheology modifiers are typically added at concentrations of about 0.1 to about 2 wt. % of the total ink.

Inhibitor

In some approaches, inhibitors may be added to the ink to reduce the curing rate. Without inhibitors, some formulations of the inks presented herein may cure within about one to five minutes. Inhibitors allow a delay of curing greater than one to five minutes. While any suitable inhibitor may be used, illustrative inhibitors include 1-ethynylcyclohexanol and 2,4,6,8-tetramethyl-2,4,6,8-tetravinylcyclotetrasiloxane. The amount of inhibitor may include a range of 100 ppm to 3000 ppm. An effective amount of inhibitor may be used to control the onset of curing for a predefined duration of time, e.g., time for printing a part with the ink. In approaches of ink having inhibitor, a heating step may be included after extrusion to decrease the inhibitor function, thereby accelerating curing.

TABLE 1-continued

Example of a Two Part Ink

| Part A | Part B |
|---|---|
| Solubilizer | Solubilizer |
| Rheology Modifier | Rheology Modifier |
|  | Inhibitor* |

*Optional

In an alternative approach, an ink may not include an inhibitor and components of the ink are mixed at the nozzle near simultaneously with extrusion of the ink. In one approach, the ink may be split into two parts, Part A and Part B, as illustrated in Table 1. Part A may be mixed with Part B in the nozzle, and the curing occurs after extrusion of the ink. For printing a large part, e.g., a 1 kilogram (kg) part, a fast cure of the ink would benefit mechanical strength of the extruded ink at the beginning of the extrusion. In other approaches, a fast cure may benefit a geometric design of the extrusion.

In preferred approaches of a two part system, the catalyst (e.g., Pt) is kept separate from the silane crosslinker, and the inhibitor is kept separate from the catalyst. Preferably, equal parts of the primary and secondary dyes, silica filler, and rheology modifier are added in each part, with catalyst being in Part A, and silane crosslinker with inhibitor (if using inhibitor, but inhibitor may be excluded) in Part B.

Solubilizers

Solubilizers function to improve the dispersion of the fluorescent dye(s) in the ink. In some approaches, an ink may include solubilizers that are soluble to some extent in the polysiloxane resin and are capable of dissolving the fluorescent dyes. Noteworthy solubilizers include dichloromethane, tetrahydrofuran, toluene, styrene, vinyl toluene, and hexane. These solubilizers can either be left in the ink after compounding or removed by vacuum processes after the ink or part is produced. Styrene and vinyl toluene can be left in the ink and cured, during which time they bond to the silane crosslinker and increase the degree of phenylation of the ink. A preferred amount of solubilizer depends on the solubility of the dyes and, thus, the amount varies depending on the dyes included in the ink. An effective amount of solubilizer may be added to cause the solubilization of the dye in the ink.

Other compounds can be added to modulate the scintillation properties of the material. Sensitivity to low-energy neutrons can be imparted by adding soluble compounds containing boron. Notable examples include o-carborane, triethyl borate, and diethyl (4-vinylphenyl)boronate. Scintillation decay times can be modulated by adding scintillation quenchers such as carbon tetrachloride, benzophenone, and acetophenone. Scintillation yield and degree of phenylation can be modulated by adding phenylated vinylsilanes such as dimethylphenylvinylsilane, methyldiphenylvinylsilane, and triphenylvinylsilane.

TABLE 1

Example of a Two Part Ink

| Part A | Part B |
|---|---|
| Phenylated PDMS Resin | Phenylated PDMS Resin |
| Catalyst | Silane Crosslinker |
| Silica Filler | Silica Filler |
| Primary Dye | Primary Dye |
| Secondary Dye | Secondary Dye |

TABLE 2

Example 1 of a Blue-emitting Polysiloxane Ink

| Component | | Mass (g) | Wt. % |
|---|---|---|---|
| PDV-1635 | Phenylated PDMS Resin | 97 | 69.3% |
| HMS-992 | Silane Crosslinker | 1.6 | 1.14% |
| Karstedt's Catalyst | Pt-based catalyst | 0.05 | 0.04% |
| Aerosil R8200 | Fumed Silica | 35 | 25.0% |

TABLE 2-continued

Example 1 of a Blue-emitting Polysiloxane Ink

| Component | | Mass (g) | Wt. % |
|---|---|---|---|
| PPO | Primary Dye | 1.4 | 1.0% |
| bis-MSB | Secondary Dye | 0.14 | 0.10% |
| Toluene | Solubilizer | 4.0 | 2.86% |
| Bluesil Thixo Add 22646 | Rheology Modifier | 0.70 | 0.50% |
| 1-ethynylcyclohexanol | inhibitor | 0.05 | 0.04% |
| | | 140 | 100.0% |

Examples of Ink Formulations for Optically Transparent Polysiloxane Scintillators In some aspects of the invention, an ink formulation may be used to fabricate a bulk scintillator structure. For example, a scintillator may be assembled from smaller bulk scintillator structures comprised of different scintillator materials, e.g., a structure of assembled microcubes. In other aspects, an ink formulation may be used to form a structure using additive manufacturing, e.g., extrusion 3D printing.

Table 2 includes components of a blue-emitting polysiloxane ink as Example 1. The secondary dye bis-MSB emits the blue color of the ink. Table 3 illustrates components of the blue polysiloxane ink of Example 1 split into Part A and Part B.

TABLE 3

Blue-emitting Polysiloxane Ink of Example 1 split into Part A and Part B

| Component | | Mass (g) | Wt. % |
|---|---|---|---|
| Part A | | | |
| PDV-1635 | Phenylated PDMS Resin | 49.30 | 35.2% |
| Karstedt's Catalyst | Pt-based catalyst | 0.05 | 0.04% |
| Aerosil R8200 | Fumed Silica | 17.50 | 12.5% |
| PPO | Primary Dye | 0.70 | 0.5% |
| bis-MSB | Secondary Dye | 0.07 | 0.05% |
| Toluene | Solubilizer | 2.00 | 1.43% |
| Bluesil Thixo Add 22646 | Rheology Modifier | 0.35 | 0.25% |
| | | 70.0 | 50.0% |
| Part B | | | |
| PDV-1635 | Phenylated PDMS Resin | 47.70 | 34.1% |
| HMS-992 | Silane Crosslinker | 1.60 | 1.14% |
| Aerosil R8200 | Fumed Silica | 17.50 | 12.5% |
| PPO | Primary Dye | 0.70 | 0.5% |
| bis-MSB | Secondary Dye | 0.07 | 0.05% |
| Toluene | Solubilizer | 2.00 | 1.43% |
| Bluesil Thixo Add 22646 | Rheology Modifier | 0.35 | 0.25% |
| 1-ethynylcyclohexanol | inhibitor | 0.05 | 0.04% |
| | | 70 | 50.0% |

Table 4 includes components of a green emitting polysiloxane ink as Example 2. The secondary dye is 3-HF which is a green emitting dye. Example 2 also includes phenylated MT resin as a stiffener in addition to filler, fumed silica.

Table 5 includes components of a blue-emitting polysiloxane ink as Example 3. The blue-emitting polysiloxane ink includes a resinous filler, phenylated MT Resin as the base polysiloxane. The secondary dye is DPA that emits a blue color.

TABLE 4

Example 2 of a Green-emitting Polysiloxane Ink with Stiffener

| Component | | Mass (g) | Wt. % |
|---|---|---|---|
| PDV-1635 | Phenylated PDMS Resin | 97 | 65.8% |
| HMS-992 | Silane Crosslinker | 1.6 | 1.09% |
| PLY-7716 | Phenylated MT Resin | 7.36 | 4.99% |
| Karstedt's Catalyst | Pt-based catalyst | 0.05 | 0.03% |
| Aerosil R8200 | Fumed Silica | 35 | 23.7% |
| PPO | Primary Dye | 1.48 | 1.0% |
| 3-HF | Secondary Dye | 0.15 | 0.10% |
| Toluene | Solubilizer | 4.0 | 2.71% |
| Bluesil Thixo Add 22646 | Rheology Modifier | 0.73 | 0.50% |
| 1-ethynylcyclohexanol | inhibitor | 0.06 | 0.04% |
| | | 147.4 | 100.0% |

Conventional additive manufacturing equipment may be used to print various inks described herein.

Inks can be formulated as a single part and printed, or as two separate parts and mixed using an active mixer during printing. An example procedure for compounding the ink is as follows. Appropriate masses of PDV-1635 and Karstedt's

TABLE 5

Example 3 of a Blue-emitting Polysiloxane Ink, Rigid Part

| Component | | Mass (g) | Wt. % |
|---|---|---|---|
| PLY-7716 | Phenylated MT Resin | 133 | 60.80% |
| HMS-992 | Silane Crosslinker | 25.5 | 11.66% |
| Karstedt's Catalyst | Pt-based catalyst | 0.14 | 0.06% |
| Aerosil R8200 | Fumed Silica | 54 | 24.69% |
| PPO | Primary Dye | 1.4 | 0.64% |
| DPA | Secondary Dye | 0.14 | 0.06% |
| THF | Solubilizer | 4.0 | 1.83% |
| Bluesil Thixo Add 22646 | Rheology Modifier | 0.47 | 0.21% |
| 1-ethynylcyclohexanol | inhibitor | 0.1 | 0.05% |
| | | 218.8 | 100.0% | catalyst are added to a mixing cup and mixed thoroughly in a planetary mixer. Aerosil R8200 is added to the resin and mixed until wetted, then Bluesil Thixo Add 22646 is added and mixed to form the base polysiloxane ink. PPO, bis-MSB, HMS-992, and 1-ethynylcyclohexanol are dissolved in toluene, which is then added to the polysiloxane ink. The resulting ink is mixed in a planetary mixer under vacuum to thoroughly blend all components, remove entrained air, and strip the toluene from the ink. The resulting ink is printed in the desired geometry and cured at 90° C. for 16 hours.

In some approaches, inks may be printed with a multi-material 3D printer with a 3D computer-controlled translational stage. Computer-controlled motors attached to linear actuators are used to drive syringes to dispense the ink. For multimaterial printing, two ink components are driven into a micromixer print head at arbitrary flow rates. The two inks can be either two different resins with different ink properties (e.g., dye concentration, crosslinking concentration, etc.) or two parts of the same resin which are actively mixed to initiate crosslinking.

Inks may be extruded to print complex 3D shapes. In one inventive aspect, a scintillator product includes a 3D structure having physical characteristics of formation by additive manufacturing. The 3D structure includes a material formed from an ink described herein, including a phenylated siloxane polymer having at least one functional group for crosslinking, a filler having a refractive index about matching a refractive index of the phenylated siloxane polymer, and at least one fluorescent dye. As described more fully herein, the refractive indices of the phenylated siloxane polymer and filler are within about 5% of one another but ideally as closely matched as possible. The scintillator product is optically transparent.

According to one inventive aspect, a scintillator product may be formed by additive manufacturing as a 3D structure having an architecture specific to the application of the scintillator product. In particular, the internal architecture of the 3D structure may be pre-defined by using specific additive manufacturing techniques. In various approaches, complex 3D shapes may include a sheet, a log-pile, a checkerboard, a geometric shape, etc. Forming a complex geometric shape by additive manufacturing techniques allows the formation of a structure having uniform features in a geometric arrangement. For example, extrusion of an ink by direct ink writing (DIW) forms uniform filaments in a generally uniform, regular, etc. pattern that has accurate pre-defined dimensions with pre-defined regularity.

Figure 3:
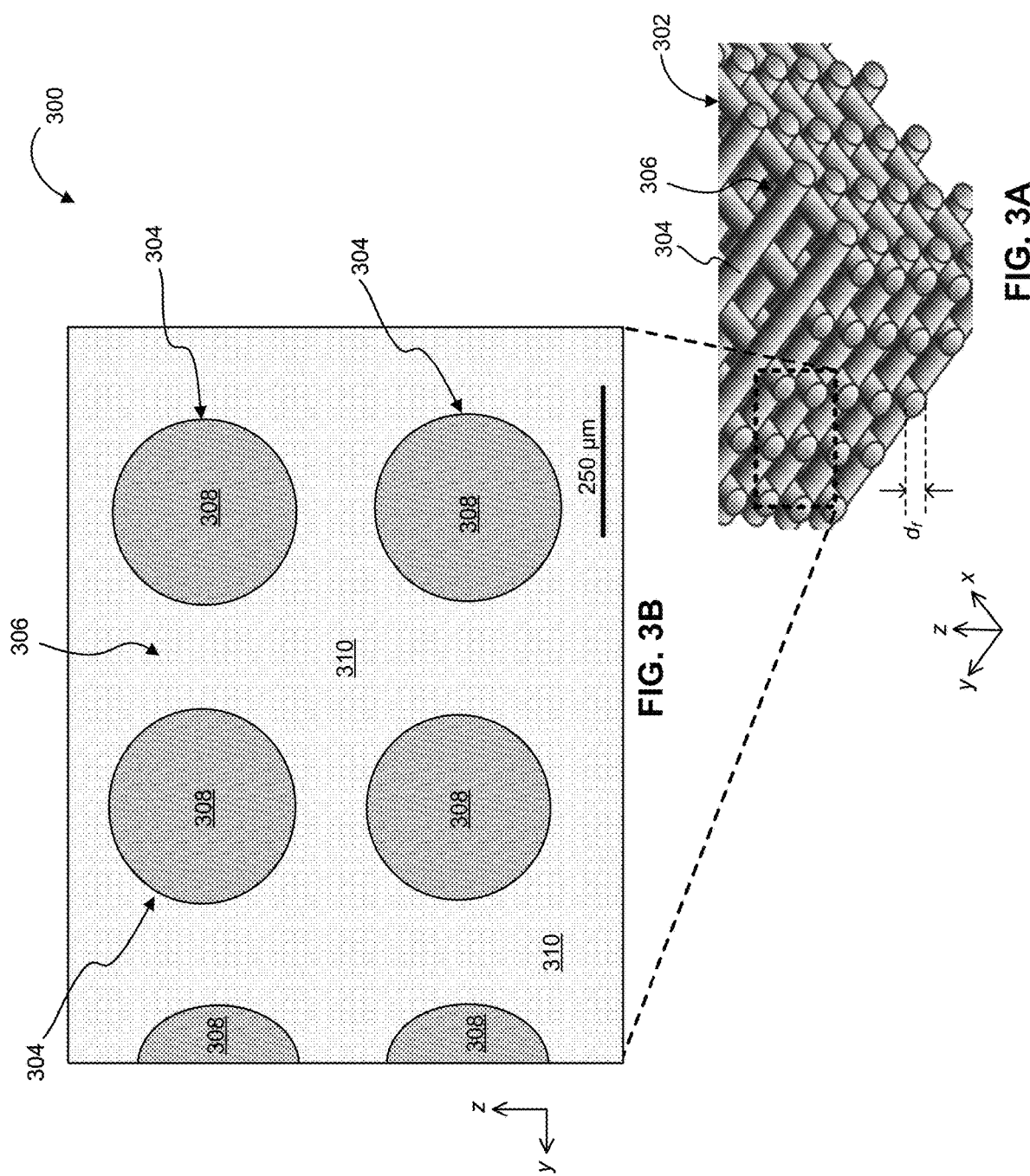
FIG. 3A is schematic drawing of a 3D printed log-pile structure of a polysiloxane scintillator, according to one inventive aspect.
FIG. 3B is a magnified side view of a portion the 3D printed log-pile structure of FIG. 3A as a heterogeneous polysiloxane scintillator, according to one approach.

FIGS. 3A-3B depicts a structure 300 of scintillator material formed by additive manufacturing techniques, in accordance with one inventive aspect. As an option, the present structure 300 may be implemented in conjunction with features from any other inventive aspect listed herein, such as those described with reference to the other FIGS. Of course, however, such structure 300 and others presented herein may be used in various applications and/or in permutations which may or may not be specifically described in the illustrative embodiments listed herein. Further, the structure 300 presented herein may be used in any desired environment.

According to one inventive aspect, a scintillator product may be formed in a pre-defined pattern, and by patterning scintillator materials in a 3D structure, radiation may be tested relative to the patterned scintillator structure. For example, some radiation may move more quickly in the scintillator and the pattern may detect the length, pattern, intensity, etc. of the radiation movement in the scintillator product. In one approach, a scintillator product may be printed by additive manufacturing according to a customized, pre-defined, etc. pattern to match the behavior of radiation as the radiation is interacting with the scintillator. In so doing, specific features of the incoming radiation may be monitored, measured, identified, etc. In one example, a known radiation pathway in a pre-defined scintillator may allow identification of radiation from an unknown source.

In one approach, a scintillator structure may include two materials having different types of scintillator components, e.g., color-emitting dyes. In one approach, a scintillator structure having very fine features may be formed; and a different scintillator material may be positioned adjacent to the scintillator structure. For example, FIG. 3A is a schematic drawing of a log-pile structure 302 formed by extruding an ink by a DIW technique. The 3D structure has physical characteristics of AM techniques as illustrated in the log-pile structure 302 including extruded filaments 304, e.g., ligaments, strands, etc. having interstitial spaces 306 between the filaments 304.

According to one aspect of an inventive concept, a 3D printed polymer structure may include a plurality of layers in which each layer is formed from at least one filament (e.g., a first layer, a second layer, a third layer, etc.). In one approach, the filament may be a continuous filament forming all the layers of the structure.

In one approach, the composition of the material of the filament for the first layer, second layer, third layer, etc. may be the same. The ink forming the extruded filament of the 3D printed polymer structure may remain the same for the duration of the printing of the entire structure. In one approach, the composition of the material for each layer may be different.

In some approaches, the 3D printed polymer structure has a varying degree of stiffness in an x-y direction and/or a z-direction thereacross, e.g., the entire structure. In some approaches, a stress response of the 3D printed polymer structure at different strains may be tuned, engineered, designed, etc. according to the composition of the extruded ink of the structure. In one approach, components of the ink may be tuned for a less stiff print for extruding the ink into a mold, for example. For a less stiff ink formulation, a ratio of the phenylated siloxane polymer to silica filler may be about 90%:10%. Alternatively, in another approach, a stiffer ink formulation having a ratio of phenylated siloxane polymer to silica filler at about 65%:35% may be desirable for an extruded scintillator part having dimensions in the centimeter range.

In various approaches, the physical characteristics of the 3D structure include fine features, such as a filament 304, having an average diameter $d_f$ in a range of greater than 0 mm and less than about 1 mm. In some approaches, the average diameter $d_f$ may be in a range of greater than 50 microns (μm) to less than 500 μm. In preferred approaches, the average diameter of the filament, strand, ligament, etc. is defined by the diameter of the nozzle of the extrusion device.

As shown in FIG. 3B, an expanded side view of a portion of the log-pile structure 302 illustrates that the periodically spaced filaments 304 having interstitial spaces 306 of the log-pile structure 302 may be comprised of different scintillator materials. In one approach, a first type of scintillator material 308 may be 3D printed as filaments 304 that form a lattice, log-pile structure 302, then the log-pile structure 302 may be backfilled, infilled, etc. with a second type of scintillator material 310 to fill the interstitial spaces 306 to create a structured heterogeneous scintillator structure 300, according to one approach. In a preferred approach, a scintillator product includes a second scintillator material in the space between the features, filaments, ligaments, etc. of the 3D structure. In one approach, the second material includes a second fluorescent dye that is different from the at least one fluorescent dye of the first material comprising the features of the 3D structure.

Moreover, the ink of the first and second scintillator material used to form the heterogenous scintillator structure 300 have refractive indices matched to each other so that after the addition of the color-emitting dyes into each ink in a certain amount, the patterned inks maintain the same refractive index and form a transparent product. For example, an ink having a primary dye and a green-emitting secondary dye may be co-pended with a different ink having a primary dye and a blue-emitting secondary dye, and both inks have matching refractive indices so that a structure formed using a pattern of these two inks has the same base ink and thus results in a single, optically transparent monolithic part. The transparency of the product may be tuned by matching the refractive index of the base material of each ink. In an exemplary approach, the printed scintillator part is essentially free of optical interfaces thereby creating an optical transparent part.

In various approaches, as described herein, the 3D structure may be a part of a multi-material scintillator system (MMSS). In various approaches, the fine features of each scintillator material may encode the information of the incident radiation, for example, an alpha particle hits only one of the scintillators, blue or green, so only one color would be seen, whereas a high energy electron or neutron would flash two colors, blue and green. In some approaches, this capability of the polysiloxane scintillator structure may function better as a scintillator for particle identification process of detecting radiation compared to pulse shape discrimination (PSD). A 3D printed structure, such as a log-pile structure, may allow the ability to manufacture features in the polysiloxane on the approximate scale of 100 microns demonstrated. In various approaches, producing smaller features may enable better performance of the scintillator material.

In one approach, if a particle were to hit the scintillator and produce a recoil traveling perpendicular to the strand (from left to right), first the particle would strike a first material and then a second material, so each color from each type of material will be emitted. In one approach, if a particle were to produce a recoil traveling parallel to the strand and remaining within the strand, only a single color—that emitted by the material in the strand—would be emitted. As described herein, an analysis of this color measurement may provide information regarding the location of the origin of the particle. Thus, the identity of the radiation, the direction of the particle trajectory, and the location of the source may be determined. In another approach, a similar analysis of color measurements may allow for the spectrum of particle energies emitted from the radioactive source to be reconstructed, thereby permitting determination of the identity of the source. In one approach, the manufacture of fine structures by techniques as described herein allows optical performance of analysis of color measurements for radiation detection.

In some approaches, the phenylated siloxane polymer scintillating ink may form a bulk monolith structure.

In one inventive aspect, a phenylated siloxane polymer scintillator ink may form a transparent monolithic scintillator. In preferred approaches, the refractive index of the phenylated polysiloxane resin can be matched with the filler. For example, in one phenylated polysiloxane resin ink having 25% of the mass being filler, such as silica, the refractive index of the resin may be matched with the refractive index of the filler thereby removing the scattering effect of the powder and thereby resulting in a transparent material. In one approach, transparency may be measured as the material having loss of light due to scattering of less than 5% per cm.

In preferred approaches, a scintillator part has sufficient transparency so that light passes through any portion of the scintillator to the surface of the scintillator to be detected by adjacent sensor (see FIG. 1A, sensors 108a, 108b adjacent to the surface 110 of the MMSS scintillator 104). For example, a scintillator that is cloudy, i.e., having increased light scattering, instead of clear and optically transparent, would exhibit low performance in allowing light to reach the surface of the scintillator structure for detection. In some approaches, a scintillator structure may have a small size and some light scattering but still allows light to pass through. Alternatively, a large-size scintillator structure needs to be optically transparent, e.g., having light transmission greater than 90%, for light to pass through the structure to the surface for detection. The optical transparency may be measured in terms of a light attenuation length, where a light attenuation length is defined as the length light travels in a material before the light is absorbed to an extent to reduce the light by a factor of 1/e. In preferred approaches, a scintillator has a light attenuation length of at least 20 cm which is about equivalent to the light being reduced by about 5% per cm. In an exemplary approach, a scintillator has a light attenuation length of as much as 380 cm.

In preferred approaches, a scintillator material produces a sufficient quantity of light from energetic radiation interactions that the light may be detected precisely by sensors. In preferred approaches, a scintillator material produces at least 3000 photons per megaelectron-volt (MeV) of radiation energy deposited. In exemplary approaches, a scintillator material produces between 8,000 and 10,000 photons per MeV.

In one inventive concept, a complex 3D shape of a scintillator structure may include a scintillator material having a pre-defined compositional gradient. In one approach a predefined gradient print may include a gradient formed from two different inks mixed in the nozzle prior to extrusion, with the relative ratio of the inks added to the nozzle changing to create the gradient. In another approach, a predefined gradient print may include a gradient formed from two different inks mixed prior to addition to the nozzle, with the relative ratio of the inks added to the nozzle changing to create the gradient. In yet another approach, a predefined gradient print may include each layer of a different composition of two inks forming a gradient of composition in the structure. Each ink used to form the structure preferably has the refractive index of the ink matched resulting in an optically transparent final product.

Figure 4:
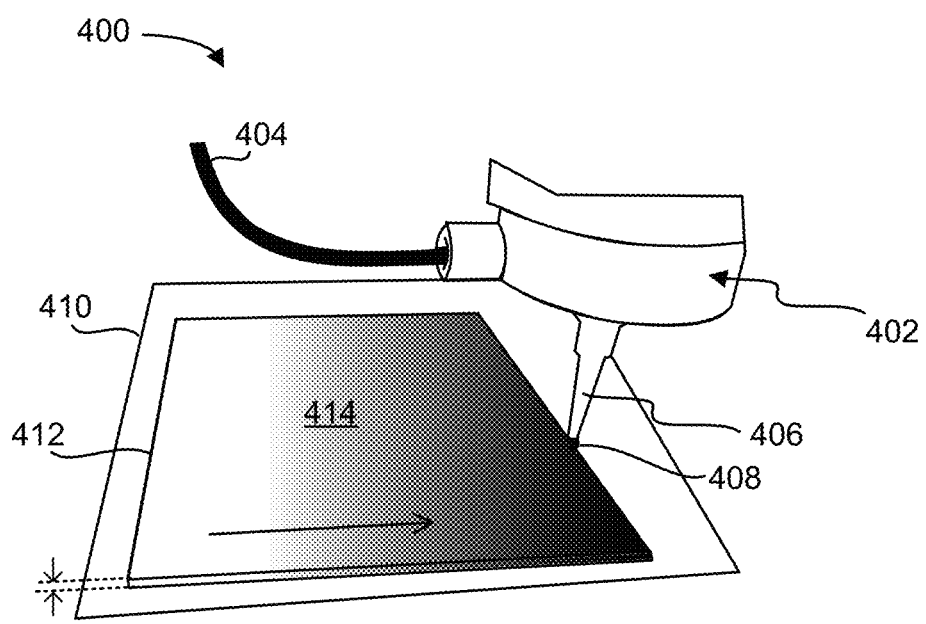
FIG. 4 is schematic drawing of a 3D-printed structure having a compositional gradient of scintillator material, according to one inventive aspect.

FIG. 4 depicts a schematic drawing of an extrusion 3D printing process 400 forming a gradient print lattice 412. In one approach, an extrusion apparatus 402 includes a nozzle 406 for extruding an ink 404 to form an extruded filament 408 on a substrate 410. The ink may include a combination, mixture, etc. of colored dyes, e.g., green-emitting, blue-emitting, etc. where the ink is mixed in the form of a compositional gradient 414 before extrusion to form the filament 408. In one approach, a first ink having a first dye may be mixed with a second ink having a second dye before addition to nozzle for extrusion. In another approach, the first ink having a first dye and the second ink having a second dye may be mixed in the nozzle with an active mixer prior to extrusion to form a filament. The gradient print lattice 412 includes a compositional gradient 414 of the ink 404 including the second ink in the first ink, as depicted by the gradient of shading (white to black in a gradient direction of the arrow), the shading is for illustrative purposes only, the gradient print lattice 412 of the combination of the first and second ink forms a transparent material.

In one approach, the compositional gradient of the material of the filament for the first layer, second layer, third layer, etc. may be the same for each layer. The inks forming the compositional gradient of the extruded filament of the 3D printed polymer structure may remain the same for the duration of the printing of the entire structure. In another approach, the compositional gradient of the material for each layer may be different. For example, one layer may have a compositional gradient of a first and second ink having different fluors, and a second layer may have a compositional gradient of a second and third ink having different fluors, etc.

In preferred approaches, an ink for a scintillator structure includes combination of fluorescent dye that exhibit a bright emission, near visible light, for optimal detection by the adjacent sensors to the scintillator structure. As an example, the polysiloxane scintillator ink may be cast to form a monolithic part. In one approach, the polysiloxane scintillator ink for forming a monolithic part may not include a rheology modifier. In some preferred approaches, a combination of a primary dye and a secondary dye in the ink may provide optimal detection of light by the sensors. In some approaches, a secondary dye that emits a different color, e.g., a green-emitting dye, may be added in the place of a blue-emitting secondary dye.

In some approaches, performance of the scintillators may be preferable using blue-emitting and green-emitting secondary dyes. In some approaches, each of these scintillator fabrications may be mixed as two different types of material in one scintillator structure, e.g., as shown in FIG. 3B.

In preferred approaches, different scintillator materials may be excited at the same wavelength, and each scintillator material may emit at a different wavelength, such as the blue-emitting scintillator has minimal emission overlap with the green-emitting scintillator, and the emission of the purple-emitting scintillator does not overlap the emission of the green-emitting scintillator. Thus, some pairs of scintillator material are preferable for distinguishing differences in emission in response to radiation-induced excitation. For a 3D printed structure having a blue-emitting scintillator material and a green-emitting scintillator material, incoming radiation may pass through the blue-emitting segment and emit blue, and in some types of radiation may pass further through the green-emitting segment the radiation will emit green. Thus, the path of the radiation may be mapped by the measured emission spectra that are completely separate and have minimal overlap. A clear differentiation between two different color-emitting dyes allows differentiation between color-specific sensors resulting in a definitive measurement of how much of each color-emitting light is generated by the radiation in the scintillator. The ability to measure how much each different color is emitted is critical to differentiate the radiation interaction with a multi-material scintillator structure. In one approach, a number of radiation properties may be identified according to a specific scintillator structure. For example, the behavior of the radiation passing through the scintillator structure may indicate the type of radiation species, the location of the radiation hit in the scintillator structure, the direction of the recoil, etc.

General Scintillator-Based Radiation Detector System

Figure 5:
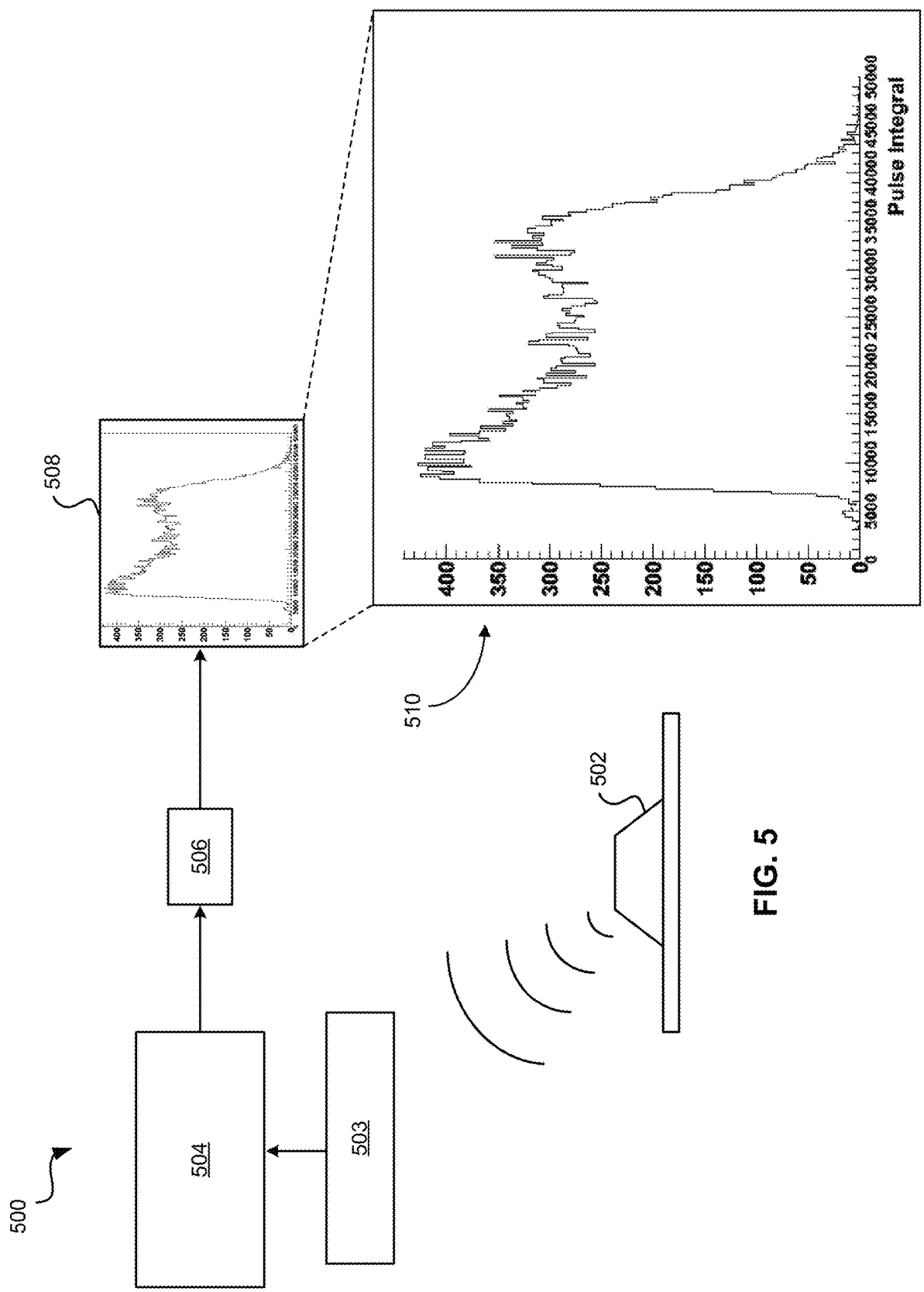
FIG. 5 is a schematic drawing of a simplified layout of an instrument system, according to one inventive aspect.

FIG. 5 depicts a simplified scintillation detection system according to one inventive aspect. In one approach, the system includes a PID-MMSS system. The system 500 comprises a scintillator material 502, such as of a type described herein, and which is referred to herein interchangeably as a scintillator. The system 500 also includes a photodetector 504, such as a photomultiplier tube or other device known in the art, which can detect light emitted from the scintillator 502 and detect the response of the material to radiation such as at least one of neutrons, gamma rays, X-rays, protons, alpha particles, beta particles, high-energy ions or electrons, neutrinos, or any incident radiation that generates ionizations or excitations within the scintillator.

The scintillator 502 produces light pulses upon occurrence of an event, such as a neutron, a gamma ray, or other radiation engaging the scintillator 502. As the gamma ray, for example, traverses the scintillator 502, photons are released, appearing as light pulses emitted from the scintillator 502. One or more optical filter 503 are positioned between the scintillator 502 and the photodetector 504. Each of the one or more optical filters 503 may selectively remove only one wavelength range of the system 500. The light pulses are detected by the photodetector 504 and transduced into electrical signals that correspond to the pulses. The type of radiation can then be determined by analyzing the light pulses and thereby identifying the gamma ray energy absorbed by the scintillator.

The system 500 includes a device 506 for processing pulse height, waveform output and/or particle identity by the photodetector 504. The result of the processing 510 may be displayed and/or stored on a display device 508 in any form, such as in a histogram or derivative thereof.

As an example only, the result of the processing 510 may be a plot of a pulse height spectrum of a 3D printable polysiloxane scintillator under gamma irradiation from Cs-137. As shown, the plot depicts the $^{137}$Cs Compton edge of the 3D printed blue-emitting polysiloxane scintillator. The Compton edge is represented by the second peak at a pulse integral of 34,000 as the highest amount of energy that can be transferred between the incident gamma ray and a single electron the material. The second peak may be used to determine the energy of the gamma source. A higher energy gamma source will shift the peak to the right, and a lower energy gamma source will shift the peak to the left. In some approaches, the Compton edge may be used to determine information about the gamma source.

In some approaches, the system may include more than one device for processing radiation detection. In one approach, a dual readout may include the processing using two photodetectors with the same or different optical filters.

The program environment in which one aspect of the invention may be executed illustratively incorporates one or more general purpose computers or special-purpose devices such handheld computers. Details of such devices (e.g., processor, memory, data storage, input and output devices) are well known and are omitted for the sake of clarity.

Figure 6:
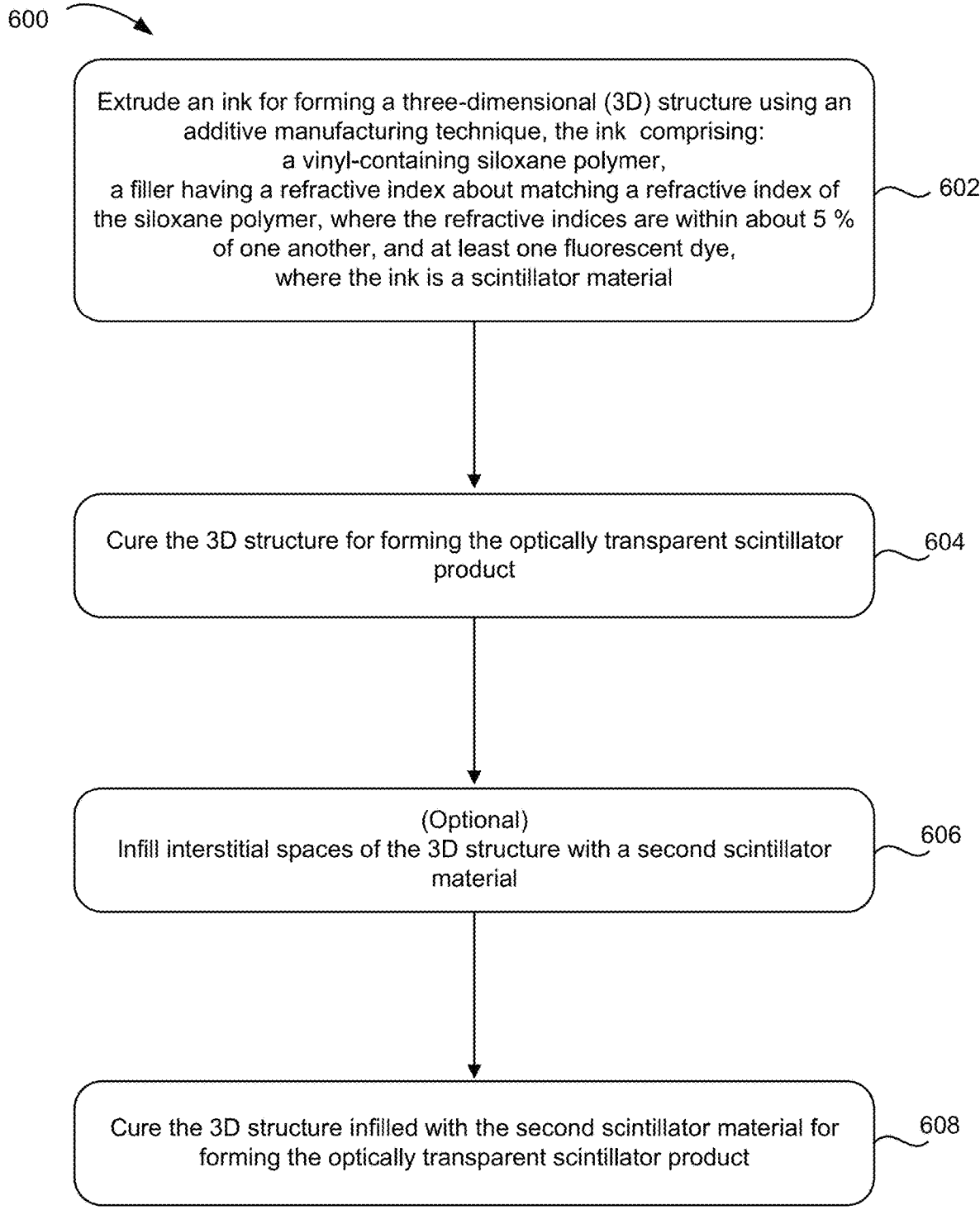
FIG. 6 is a flow chart of a method, according to one inventive aspect.

FIG. 6 shows a method 600 for forming an optically transparent scintillator product, in accordance with one aspect of one inventive concept. As an option, the present method 600 may be implemented to construct structures such as those shown in the other FIGS. described herein. Of course, however, this method 600 and others presented herein may be used to form structures for a wide variety of devices and/or purposes which may or may not be related to the illustrative embodiments listed herein. Further, the methods presented herein may be carried out in any desired environment. Moreover, more or less operations than those shown in FIG. 6 may be included in method 600, according to various embodiments. It should also be noted that any of the aforementioned features may be used in any of the embodiments described in accordance with the various methods.

Step 602 of method 600 includes extruding an ink for forming a 3D structure using an additive manufacturing technique. The ink is a scintillator material and includes a composition as more fully described herein. In one approach, the ink includes a phenylated siloxane polymer having at least one functional group per molecule for crosslinking, a filler having a refractive index about matching the refractive index of the phenylated siloxane polymer, and at least one fluorescent dye. The refractive indices of the phenylated siloxane polymer and the filler are within about 5% of each other but are ideally as closely matched as possible. In preferred approaches, the phenylated siloxane polymer may include some degree of phenyl groups, such as phenylmethylsiloxane, diphenylsiloxane, etc. In various approaches, the ink may include at least one of the following additives: a crosslinker, a catalyst, an inhibitor a rheology modifier, a solubilizer, etc.

In some approaches, as described herein, the at least one fluorescent dye in the ink may include a primary dye and a secondary dye. In one approach, extruding the ink includes extruding a second ink, where the ink and the second ink are extruded for forming a pre-defined compositional gradient in the product, e.g., the formed structure. The second ink may include a different composition from the first ink. For example, the first ink includes a first type of color-emitting dye and the second ink includes a second type of color-emitting dye, such that a gradient is formed in the structure of the second type of color-emitting dye.

In one approach, the inks may be combined at room temperature. In some instances, temperature may vary as determined by the component of the mixture as generally understood by one skilled in the art. In various approaches, the mixer rate of the ink in a mixing system may be defined as the rate of mixing the ink in a nozzle, cartridge, etc. prior to extruding the ink to a substrate. The rate is measured in revolutions per minute of a paddle, impeller, stirring rod, etc.

A method 600 as shown in FIG. 6 of forming an optically transparent scintillator product may be highly scalable and compatible with additive manufacturing (e.g., 3D printing methods such as extrusion of the ink by direct ink writing (DIW) and other extrusion methods. In various approaches, the product has physical characteristics of formation by an additive manufacturing technique. In various approaches, physical characteristics may include filaments arranged in a geometric pattern, a patterned outer surface defined by stacking filaments, defined interstitial spaces (e.g., ordered, controlled, non-random, etc.), etc. Thus, using these additive manufacturing techniques allows engineering of parts and production of optimal geometry for scintillator use.

In some approaches, the size of the scintillator structure formed by additive manufacturing may be scaled to sizes having at least one dimension of about 50 mm. In one approach, a large-sized scintillator may be formed having at least one dimension about 1 meter. In one approach, a size of the formed scintillator structure may be defined by the additive manufacturing technique. In one approach of forming a large-size scintillator product, components of the ink e.g., silica filler, rheology modifies, etc. may be tuned to formulate a stiffer ink for printing large-size structures. Preferably, a stiffer ink would allow extruded filaments to withstand the weight of subsequent formed layers, thereby preventing the lower layers of extruded filaments from collapse, deformation, etc.

For example, in one approach, a formulation having 20 to 23 wt. % silica filler may allow formation of a structure having a thickness of a few millimeters before the lower layers exhibit a collapse effect from the weight of the newly extruded layers above. In one preferred approach, a formulation having 30 wt. % silica filler, a part having dimensions in at least the centimeter range may be formed without deformation of the lower layers.

In some approaches, a method for forming an optically transparent 3D printed structure includes forming a 3D printed part by extruding an ink through the nozzle during direct ink writing processes and curing the 3D structure. In some approaches, the 3D printed structure is cured following the printing step. Step 604 includes curing the 3D structure for forming the optically transparent scintillator product. The curing step may include heating the printed structure at a temperature in a range of room temperature to about 150° C. for a duration of time. In an exemplary approach, the curing includes heating the structure to 150° C. for 16 hours. Temperatures higher than 220° C. may induce decomposition of the material in the structure. In other approaches, the curing may include thermal curing, ultraviolet curing, peroxide curing, moisture curing, etc.

According to one inventive aspect, method 600 may include a step 606 after curing the 3D structure that includes infilling interstitial spaces of the 3D structure with a second scintillator material. The second scintillator material preferably has a different composition than the composition of the scintillator material comprising the formed 3D structure. For example, the second scintillator includes a different color-emitting dye than the color-emitting dye present in the scintillator material comprising the formed 3D structure.

In one approach, step 606 may include infilling the formed structure with a second material using centrifugal force. For example, the formed structure, e.g., a lattice, is placed in a centrifuge cup having a mixing cup containing a green-emitting ink (e.g., different from the color-emitting ink of the lattice). Then under centrifugal force, the green-emitting ink is pushed into the interstitial spaces of the lattice structure. After infilling the lattice by centrifugal force with the infill green-emitting ink, a vacuum may be applied to remove bubbles in the infill ink that might form during the infilling. Preferably, the part having a combination of inks is essentially free of voids, pores, bubbles, etc. In one approach, the infilling may include two separate steps: application of centrifugal force during infilling followed by application of a vacuum under centrifugal force. In another approach, the infilling may include a single combined step of infilling under centrifugal force and vacuum applied simultaneously.

Step 608 includes curing the 3D structure infilled with the second scintillator material for forming the optically transparent scintillator product. In one approach, the second curing step for curing the second scintillator material may be the same as the curing step for curing the 3D structure comprised of the first scintillator material. In another approach, the second curing step for curing the second scintillator material may be different from the curing step for curing the 3D structure comprised of the first scintillator material.

Materials

Platinum divinyltetramethyldisiloxane complex (Karstedt's catalyst, low color, ca. 2% Pt) in divinyl-terminated PDMS, trimethylsilyl-terminated polymethylhydrosiloxane (20-35 cSt) HMS-992, and divinyl-terminated poly (diphenylsiloxane-dimethylsiloxane) copolymer (5,000 cSt, ca. 15-17 mole % diphenylsiloxane) PDV1635 were supplied by Gelest, Inc (Morrisville, PA). Bluesil™ Thixo Add 22646 was supplied by Elkem Silicones (Oslo, Norway). Aerosil® R8200 was supplied by Evonik Industries (Essen, Germany). Fluorescent dyes, solubilizers, and inhibitor PPO, bis-MSB, 3HF, DPA, THF, toluene, and 1-ethynylcyclohexanol were obtained from Sigma-Aldrich (St. Louis, MO). All materials were used without further purification. Formulations were prepared using a Thinky ARV-310LED vacuum planetary mixer (Laguna Hills, CA) for compounding.

Once formulated, all silicone-based inks were filtered (pressurized air, 90 psi) through a Swagelok 140 µm mesh filter (Solon, OH) into 30 mL syringe barrels (Nordson EFD Optimum, East Providence, RI) and centrifuged (Nordson EFD ProcessMate 5000) to eliminate entrapped air. A flat-ended piston was inserted to seal the rear of the syringe; where the syringe tip was equipped with a smooth-flow tapered nozzle (250 µm inner diameter) via luer-lock. The syringe was attached to a positive-displacement dispenser (Ultra 2800, Nordson EFD), which supplied the appropriate displacement to extrude ink through the nozzle. The syringe system was subsequently affixed to the z-axis of a custom Aerotech air-bearing gantry xy open frame movement stage, which was controlled via an A3200 controller through an Aerotech A3200 CNC operator interface (v5.05.000) (Aerotech Consumer Aerospace, Pittsburgh, PA). G-code instructions were programmed and run through the controller software to generate the desired printed lattice geometry. The printed lattices were cured in a Yamato ADP300C vacuum drying oven (Yamato Scientific America, Inc, Santa Clara, CA).

Experiments

Figure 7:
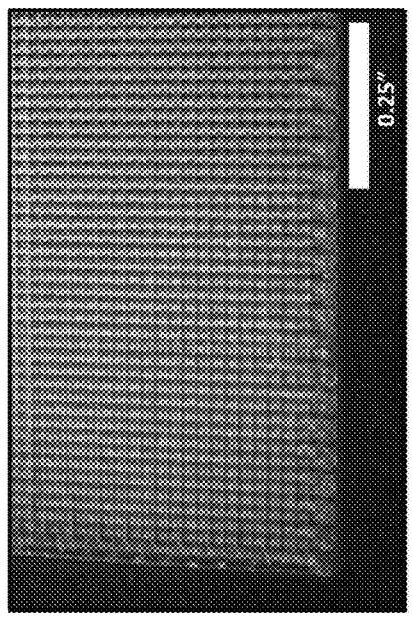
FIG. 7 is an image of 3D printed, structured, blue-emitting polysiloxane scintillator lattice, according to one inventive aspect.

FIG. 7 is an image of an extruded 3D printed blue-emitting scintillator lattice under UV excitation. The 3D printed structure is a log-pile structure having features less than 1 mm. The bar scale on the image is 0.25 inches.

Figure 8B:
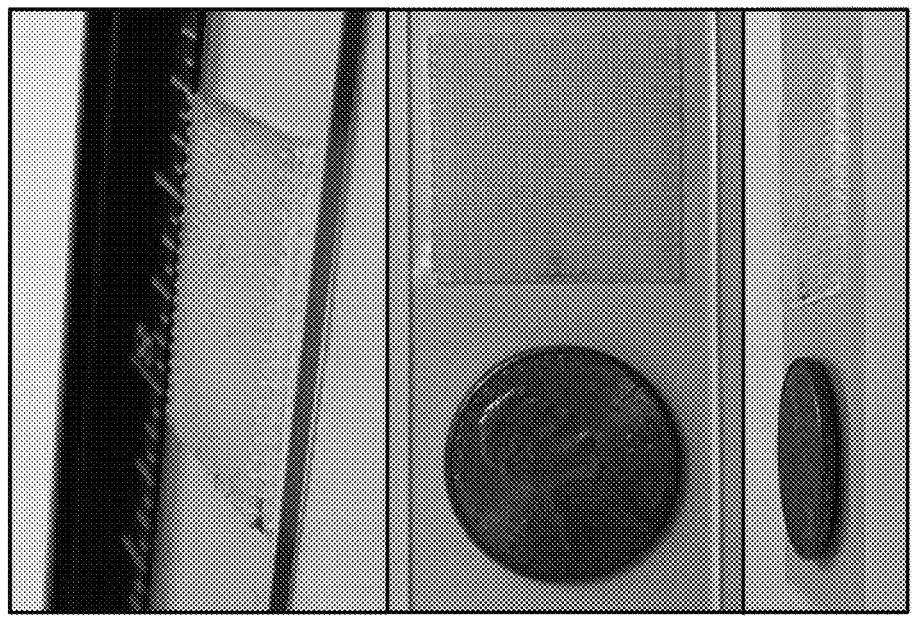
FIG. 8B depicts images of different views of an optically transparent 3D printed lattice polysiloxane scintillator, according to one inventive aspect; part (a) is a perspective view of the scintillator, part (b) is a top down view of the scintillator, and part (c) is a side view of the scintillator.
Figure 8A:
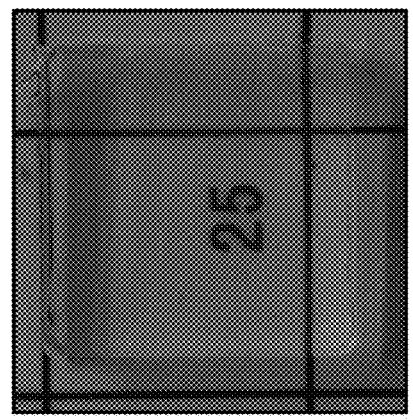
FIG. 8A is an image of an optically transparent 3D printed monolithic polysiloxane scintillator, according to one inventive aspect.

FIG. 8A is an image of a 3D printed monolithic phenylated polysiloxane scintillator. The part size is approximately 1 centimeter (cm) by 1 cm. The refractive index of the phenylated polysiloxane resin can be matched with the filler. As shown in FIG. 8A, although 25% of the mass of the phenylated polysiloxane resin ink included the filler as a white powder, the matching of the resin and the filler removed the scattering effect of the powder, thereby resulting in a transparent material.

FIG. 8B depicts different views of an optically transparent 3D-printed lattice polysiloxane scintillator. The structure was formed by extrusion printing of a continuous filament to form a lattice. The resulting structure has uniform, periodic features, e.g., filaments, and uniform porosity, e.g., spacing, between the printed filaments. Part (a) is a perspective view of the scintillator structure, part (b) is a top down view of the scintillator structure, and part (c) is a side view of the scintillator structure.

Figure 9A:
FIG. 9A is an image of a 3D structured heterogenous polysiloxane scintillator, according to one inventive aspect.
Figure 9B:
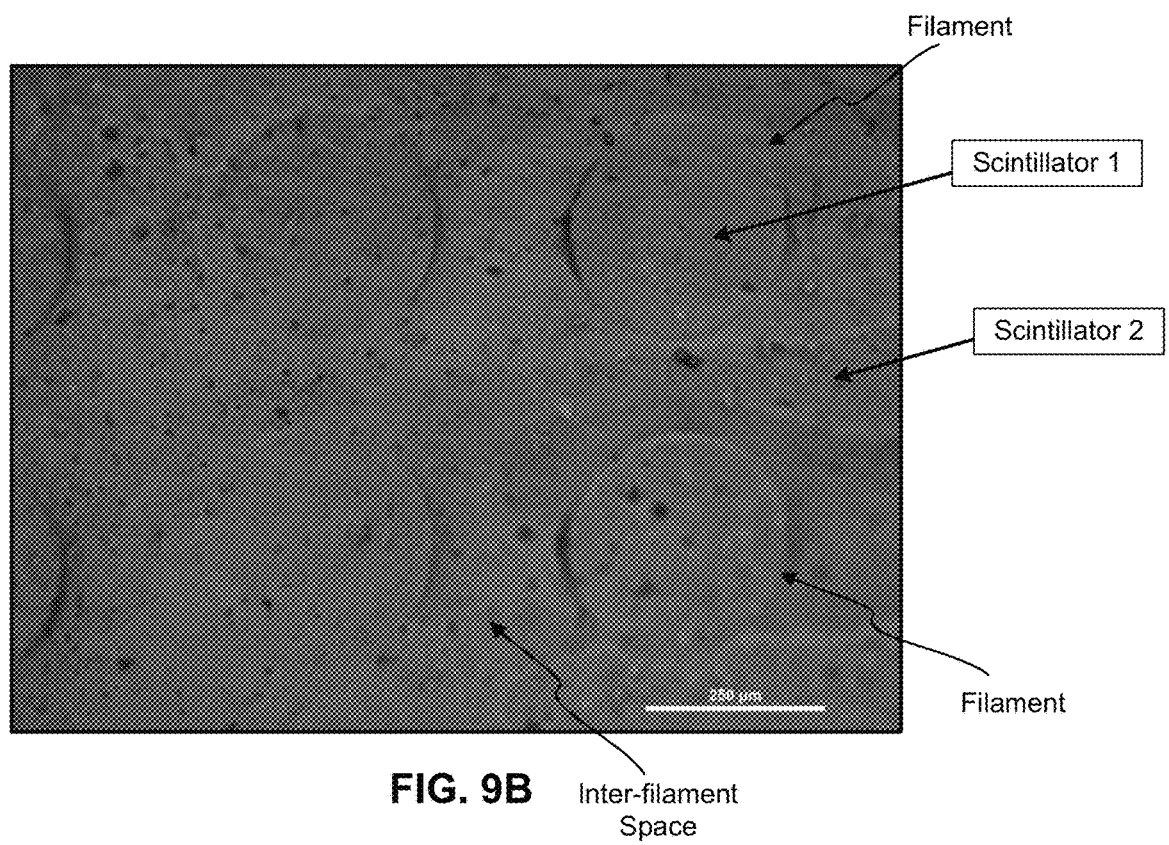
FIG. 9B is an image of a 3D structured heterogeneous polysiloxane scintillator having the second scintillator material fully infilled between the filaments of the first scintillator material, according to one inventive aspect.

FIGS. 9A and 9B depict optical microscope images of a magnified view of a 3D structured heterogenous polysiloxane scintillator having a first type of scintillator material (Scintillator 1) printed as a 3D lattice, then backfilled, infilled, etc. with a second type of scintillator (Scintillator 2) to create a structured heterogeneous scintillator, according to one approach. This capability allows the fabrication of features in the polysiloxane on the approximate scale of 100 µm as demonstrated in FIG. 9A. The image of FIG. 9B demonstrates improved infill of a second type of scintillator, Scintillator 2, between the filaments formed with a first type of scintillator (Scintillator 1). The structure as shown in FIG. 9B demonstrates the precision of extrusion-based DIW printing of forming uniform filament diameters of a series of filaments, as well as inter-filament spacing. In various approaches, producing smaller features enables better performance of the scintillator material. The fine features of each scintillator material may encode the information of the incident radiation, for example, an alpha particle hits only one of the scintillators, blue or green, so only one color would be seen, whereas a high energy electron or neutron would flash two colors, blue and green. In some approaches, this capability of the polysiloxane scintillator structure may function better as a scintillator for particle identification process of detecting radiation compared to pulse shape discrimination (PSD).

FIG. 10A shows an image of three monolithic phenylated polysiloxane scintillators from 3D printable resins with different fluorescent dye compositions. The left scintillator does not include a fluorescent dye, as seen with no emission; the middle scintillator includes only a primary dye, as seen at 383 nm emission, and right scintillator includes a primary dye plus a secondary dye, as seen at 427 nm emission. Comparing the middle scintillator to the right scintillator, the secondary dye in the right scintillator significantly brightens the emission.

FIG. 10B shows an image of a monolithic phenylated polysiloxane scintillator including a primary dye and a secondary dye that emits a green color under UV excitation made from a 3D printable resin, as seen at 525 emission.

Figure 11:
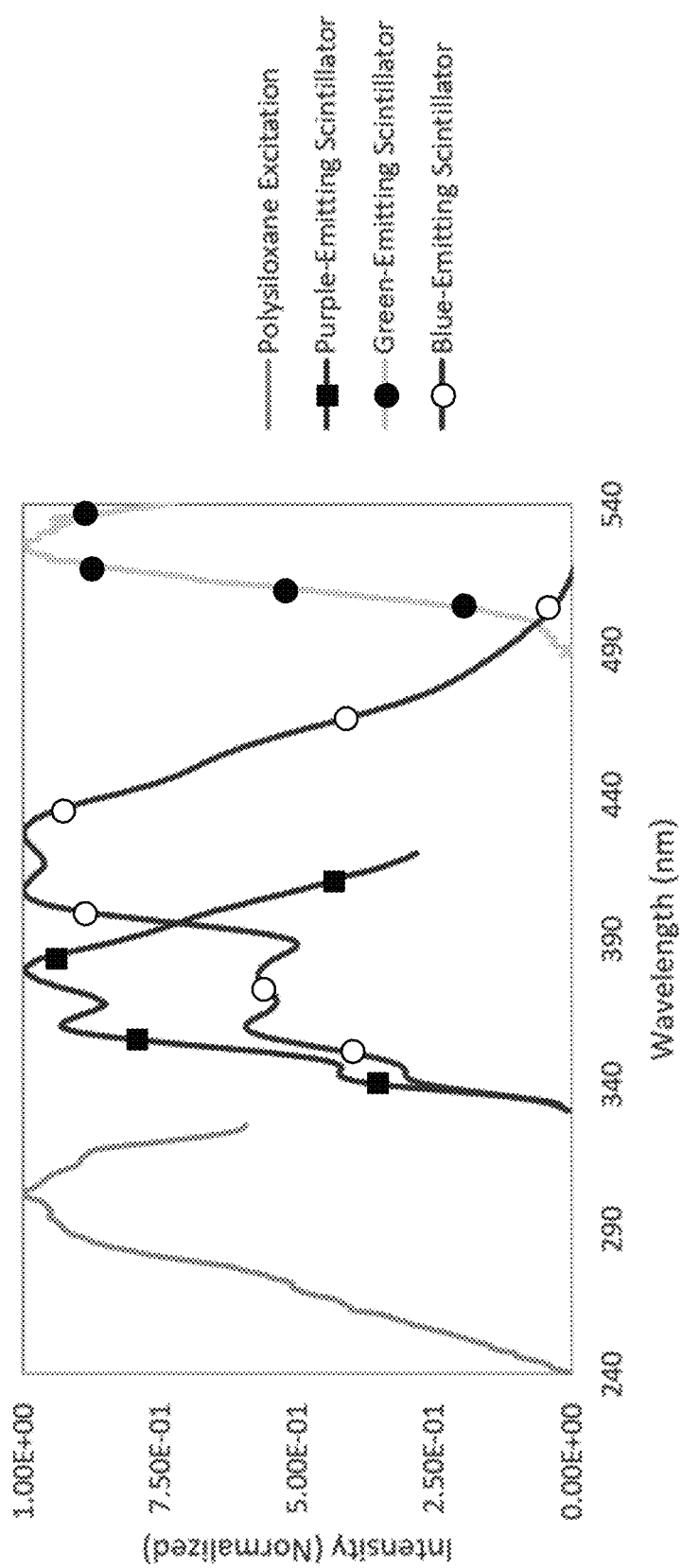
FIG. 11 is a plot of photoluminescence spectra of various 3D printable polysiloxane scintillators, according to one inventive aspect.

FIG. 11 is a plot of photoluminescence spectra of the emissions of the scintillators of FIG. 10A-10B that had been fabricated with different dyes exhibiting different emission wavelengths. The spectra include (-) excitation spectrum of polysiloxane resin, (■) emission spectra of purple-emitting scintillators (middle scintillator of FIG. 10A), (●) emission spectra of green-emitting scintillators (green scintillator of FIG. 10B), and (○) emission spectra of blue-emitting scintillators (right scintillator of FIG. 10A). Spectra are taken in reflection mode with 305 nm excitation.

APPLICATIONS AND USES

Illustrative uses of various aspects of the present invention include, but are not limited to, applications requiring radiation detection. Detection, surveillance, and monitoring of radioactive materials, illicit nuclear and radiological materials, including identification of special nuclear materials (SNM), are a few such examples. Various inventive aspects can also be used in the nuclear fuel cycle, homeland security applications, nuclear non-proliferation, space exploration, medical imaging, radiography, dosimetry, nuclear physics research, special nuclear material analysis, high energy physics facilities, radioactive waste monitoring, etc.

Yet other uses include detectors for use in treaty inspections that can monitor the location of nuclear missile warheads in a nonintrusive manner. Further uses include implementation in detectors on buoys for customs agents at U.S. maritime ports, cargo interrogation systems, and instruments that emergency response personnel can use to detect or search for a clandestine nuclear or radiological device. Assessment of radiological dispersal devices is another application.

Various inventive aspects described herein provide a more efficient, performant, and scalable way of manufacturing those detectors than any material or method currently known in the field.

Any of the methods, systems, devices, etc. described above, taken individually or in combination, in whole or in part, may be included in or used to make one or more systems, structures, etc. In addition, any of the features presented herein may be combined in any combination to create various inventive aspects, any of which fall within the scope of the present invention.

What is claimed is:

1. An ink for forming a scintillator product, the ink comprising:
   a phenylated siloxane polymer having at least one functional group per molecule for crosslinking;
   a filler, wherein the phenylated siloxane polymer has a defined phenyl content for causing a refractive index of the phenylated siloxane polymer to be within about 5% of the refractive index of the filler;
   a rheology modifier;
   a crosslinker having at least two silane functional groups per molecule, wherein the crosslinker is different than the filler; and
   at least one fluorescent dye.

2. The ink as recited in claim 1, wherein the phenylated siloxane polymer includes at least one polymer selected from the group consisting of:
   phenylmethylsiloxane and diphenylsiloxane.

3. The ink as recited in claim 1, wherein the molecular weight of the phenylated siloxane polymer is in a range of about 10,000 to 50,000 gram per mole.

4. The ink as recited in claim 1, wherein the filler includes a solid filler selected from the group consisting of: silica, fumed silica, and precipitated silica.

5. The ink as recited in claim 1, wherein the filler includes a solid filler present in the ink at about 10 wt. % to about 50 wt. % relative to the total weight of the ink.

6. The ink as recited in claim 1, further comprising a resinous filler, wherein the resinous filler is configured to function like the siloxane polymer,
wherein the relative amounts of the siloxane polymer and the resinous filler are related according to the following relationship:

$Z=X+Y$=total amount of siloxane polymer+resinous filler,

X=amount of the siloxane polymer in the ink,
Y=amount of the resinous filler in the ink,
wherein Y is in a range of at least 2 wt. % of the ink to less than 100% of Z.

7. The ink as recited in claim 1, wherein the at least one fluorescent dye includes a primary dye present in the ink in an amount of about 0.5 wt. % to about 40 wt. % relative to the total weight of the ink.

8. The ink as recited in claim 7, wherein the at least one fluorescent dye includes a primary dye and a secondary dye, wherein the secondary dye is present in the ink in an amount of about 0.05 wt. % to about 2 wt. % relative to the total weight of the ink.

9. The ink as recited in claim 1, wherein the at least one functional group per molecule for crosslinking is selected from the group consisting of: a vinyl group, an amine group, an epoxy group, a thiol group, a hydride group, a silanol group, an alkoxy group, a carbinol group, an acrylate group, a methacrylate group, an acetoxy group, a chlorine group, a dimenthylamine group, and a combination thereof.

10. The ink as recited in claim 1, wherein the crosslinker has at least three silane functional groups per molecule.

11. The ink as recited in claim 1, comprising a catalyst.

12. The ink as recited in claim 1, comprising an inhibitor.

13. The ink as recited in claim 1, comprising a solubilizer.

14. The ink as recited in claim 1, wherein the ink is characterized as a material being optically transparent after curing.

15. A scintillator product, comprising:
a three-dimensional (3D) structure having physical characteristics of formation by additive manufacturing,
wherein the 3D structure has two or more different scintillator materials arranged in a pre-defined pattern,
wherein one of the scintillator materials in the 3D structure includes a scintillator material comprising a phenylated siloxane polymer, a filler, and at least one fluorescent dye,
wherein the phenylated siloxane polymer has a defined phenyl content for causing a refractive index of the phenylated siloxane polymer to be within about 5% of a refractive index of the filler,
wherein the scintillator product is optically transparent.

16. The scintillator product as recited in claim 15, wherein the phenylated siloxane polymer includes at least one polymer selected from the group consisting of:
phenylmethylsiloxane and diphenylsiloxane.

17. The scintillator product as recited in claim 15, wherein the 3D structure has a pre-defined compositional gradient formed from two different inks, wherein one of the inks includes a formulation that is configured to form the one of the scintillator materials, wherein another of the inks includes a second fluorescent dye,
wherein the pre-defined compositional gradient includes a change in concentration of at least one of the fluorescent dyes across at least a portion of the 3D structure.

18. The scintillator product as recited in claim 15, wherein the physical characteristics include fine features having an average diameter in a range of greater than zero millimeters and less than about one millimeter.

19. The scintillator product as recited in claim 15, wherein the physical characteristics of the 3D structure include features having space therebetween, the product comprising a second material present in the space between the features.

20. The scintillator product as recited in claim 19, wherein the second material comprises a second fluorescent dye that is different from the at least one fluorescent dye.

21. The scintillator product as recited in claim 15, wherein the 3D structure is part of a multi-material scintillator system (MMSS), wherein the 3D structure has physical characteristics of formation by a multimaterial 3D printer.

22. A system, comprising: the scintillator product as recited in claim 16; and a photodetector for detecting a response of the product to irradiation by at least one radiation selected from the group consisting of: alpha particles, protons, beta particles, gamma rays, X-rays, neutrons, high-energy ion or electron, neutrino, and any incident radiation that generates excitations or ionizations within the scintillator product.

23. A method of forming an optically transparent scintillator product, the method comprising:
extruding an ink for forming a three-dimensional (3D) structure using an additive manufacturing technique, the ink comprising:
a phenylated siloxane polymer having at least one functional group per molecule for crosslinking,
a filler, wherein the phenylated siloxane polymer has a defined phenyl content for causing a refractive index of the phenylated siloxane polymer to about match a refractive index of the filler,
a crosslinker having at least two silane functional groups per molecule, wherein the crosslinker is different than the filler, and
at least one fluorescent dye,
wherein the ink is a scintillator material; and
curing the 3D structure for forming the optically transparent scintillator product.

24. The method as recited in claim 23, wherein extruding the ink includes extruding a second ink, wherein the ink and the second ink are extruded to create a compositional gradient in the product.

25. The method as recited in claim 23, further comprising:
infilling interstitial spaces of the 3D structure with a second scintillator material; and
curing the 3D structure infilled with the second scintillator material for forming the optically transparent scintillator product.

* * * * *